US011258982B2

(12) United States Patent
Atkins et al.

(10) Patent No.: US 11,258,982 B2
(45) Date of Patent: Feb. 22, 2022

(54) VIDEO CONFERENCE SYSTEM

(71) Applicant: Logitech Europe S.A., Lausanne (CH)

(72) Inventors: Andreas Franz William Atkins, Campbell, CA (US); Joseph Yao-Hua Chu, Los Gatos, CA (US); Henry Levak, San Mateo, CA (US); Kevin McLintock, San Mateo, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/543,397

(22) Filed: Aug. 16, 2019

(65) Prior Publication Data
US 2021/0051298 A1 Feb. 18, 2021

(51) Int. Cl.
*H04N 7/15* (2006.01)
*H04N 7/04* (2006.01)

(52) U.S. Cl.
CPC .......... *H04N 7/15* (2013.01); *H04N 7/04* (2013.01)

(58) Field of Classification Search
USPC ................................... 348/14.08
See application file for complete search history.

(56) References Cited

U.S. PATENT DOCUMENTS

| 5,434,617 | A  | 7/1995  | Bianchi        |
| 5,673,080 | A  | 9/1997  | Biggs et al.   |
| 6,162,020 | A  | 12/2000 | Kondo          |
| 6,240,303 | B1 | 5/2001  | Katzur         |
| 6,392,694 | B1 | 5/2002  | Bianchi        |
| 6,519,648 | B1 | 2/2003  | Eyal           |
| 6,543,405 | B2 | 4/2003  | Sachdev        |
| 6,611,281 | B2 | 8/2003  | Strubbe        |
| 6,731,334 | B1 | 5/2004  | Maeng et al.   |
| 6,829,391 | B2 | 12/2004 | Comaniciu et al.|
| 7,133,513 | B1 | 11/2006 | Zhang          |
| 7,298,733 | B2 | 11/2007 | Sakai et al.   |
| 7,349,008 | B2 | 3/2008  | Rui et al.     |
| 7,433,327 | B2 | 10/2008 | Harville et al.|
| 7,706,576 | B1 | 4/2010  | Beck et al.    |
| 7,746,401 | B2 | 6/2010  | Wu et al.      |
| 7,876,923 | B2 | 1/2011  | Finnegan et al.|
| 7,940,432 | B2 | 5/2011  | Shih et al.    |

(Continued)

OTHER PUBLICATIONS

Office Action dated Aug. 3, 2020 for U.S. Appl. No. 16/543,405.

(Continued)

*Primary Examiner* — Amal S Zenati
(74) *Attorney, Agent, or Firm* — Patterson + Sheridan, LLP

(57) ABSTRACT

Embodiments of the disclosure provided herein can be used to improve the control, selection and transmission of data to a remote video conferencing environment, by use of a plurality of wired or wirelessly connected electronic devices. In one example, the transmission of data from a local environment can be improved by switching the source of visual inputs (e.g., cameras or display of an electronic device, such as laptop) and/or audio inputs (e.g., microphones) to the one or more appropriate visual and audio sources available within the local environment. The most appropriate visual and audio sources can be the sources that provide the participants in the remote environment the most relevant data giving the remote users the best understanding of the current activities in the local environment.

21 Claims, 13 Drawing Sheets

(56) References Cited

U.S. PATENT DOCUMENTS

| | | |
|---|---|---|
| 8,094,193 B2 | 1/2012 | Peterson et al. |
| 8,132,020 B2 | 3/2012 | Zhu et al. |
| 8,237,764 B1 | 8/2012 | Chen et al. |
| 8,284,254 B2 | 10/2012 | Romanowich et al. |
| 8,300,081 B1 | 10/2012 | Sawyer |
| 8,358,328 B2 | 1/2013 | Friel et al. |
| 8,368,752 B2 | 2/2013 | Lin et al. |
| 8,396,007 B2 | 3/2013 | Gonia et al. |
| 8,471,889 B1 | 6/2013 | Lee et al. |
| 8,547,414 B2 | 10/2013 | Sheeley |
| 8,659,638 B2 | 2/2014 | Chao et al. |
| 8,780,168 B2 | 7/2014 | Corley et al. |
| 8,842,161 B2 | 9/2014 | Feng et al. |
| 8,872,882 B2 | 10/2014 | Shanmukhadas et al. |
| 8,885,057 B2 | 11/2014 | Mock |
| 8,913,103 B1 | 12/2014 | Sargin et al. |
| 8,937,930 B2 | 1/2015 | Sprigg et al. |
| 9,001,183 B2 | 4/2015 | Mauchly |
| 9,077,906 B1 | 7/2015 | Tsai et al. |
| 9,110,988 B1 | 8/2015 | Tan |
| 9,125,138 B2 | 9/2015 | Abuan et al. |
| 9,125,146 B1 | 9/2015 | Edara et al. |
| 9,237,307 B1 * | 1/2016 | Vendrow .............. H04N 7/152 |
| 9,270,941 B1 | 2/2016 | Lavelle |
| 9,338,395 B2 | 5/2016 | Wang et al. |
| 9,549,153 B1 | 1/2017 | Delorenzi et al. |
| 9,729,825 B2 | 8/2017 | Fadili et al. |
| 9,763,029 B2 | 9/2017 | Mirza et al. |
| 9,785,772 B1 | 10/2017 | Johansson et al. |
| 9,798,933 B1 | 10/2017 | Meisser et al. |
| 9,801,234 B2 | 10/2017 | Caine et al. |
| 9,942,513 B1 | 4/2018 | Aarrestad et al. |
| 9,942,661 B2 | 4/2018 | Dusse et al. |
| 9,973,561 B2 | 5/2018 | Fu et al. |
| 10,079,995 B1 | 9/2018 | Ahnoff |
| 10,115,396 B2 | 10/2018 | Anderson et al. |
| 10,268,759 B1 | 4/2019 | Witt et al. |
| 10,282,019 B2 | 5/2019 | Baek |
| 10,341,792 B1 | 7/2019 | Zhang et al. |
| 10,397,519 B1 | 8/2019 | Tangeland |
| 10,542,126 B2 | 1/2020 | Nayak |
| 10,897,599 B1 | 1/2021 | Fardig et al. |
| 2002/0106137 A1 | 8/2002 | Chen et al. |
| 2004/0003409 A1 | 1/2004 | Berstis |
| 2004/0008635 A1 | 1/2004 | Nelson et al. |
| 2004/0075772 A1 | 4/2004 | Gu et al. |
| 2004/0086000 A1 | 5/2004 | Wallace et al. |
| 2005/0014490 A1 | 1/2005 | Desai et al. |
| 2005/0058287 A1 | 3/2005 | Ferren et al. |
| 2005/0084086 A1 | 4/2005 | Hesse |
| 2005/0262201 A1 | 11/2005 | Rudolph et al. |
| 2005/0289224 A1 | 12/2005 | Deslippe et al. |
| 2006/0009985 A1 | 1/2006 | Ko et al. |
| 2006/0069797 A1 | 3/2006 | Abdo et al. |
| 2006/0095339 A1 | 5/2006 | Hayashi et al. |
| 2007/0024706 A1 | 2/2007 | Brannon et al. |
| 2007/0048712 A1 | 3/2007 | Plastina et al. |
| 2008/0089268 A1 | 4/2008 | Kinder et al. |
| 2008/0128582 A1 | 6/2008 | Serrano Rodriguez |
| 2008/0192666 A1 | 8/2008 | Koskan et al. |
| 2009/0037827 A1 | 2/2009 | Bennetts |
| 2009/0046995 A1 | 2/2009 | Kanumuri et al. |
| 2009/0174530 A1 | 7/2009 | Yen et al. |
| 2009/0207233 A1 | 8/2009 | Mauchly |
| 2009/0207234 A1 | 8/2009 | Chen et al. |
| 2009/0234721 A1 | 9/2009 | Bigelow |
| 2009/0284579 A1 | 11/2009 | Knaz |
| 2009/0287790 A1 * | 11/2009 | Upton .............. H04N 7/17318 709/208 |
| 2009/0298420 A1 | 12/2009 | Haartsen et al. |
| 2010/0284389 A1 | 11/2010 | Ramsay et al. |
| 2010/0308765 A1 | 12/2010 | Moore et al. |
| 2010/0315482 A1 | 12/2010 | Rosenfeld |
| 2011/0050843 A1 | 3/2011 | Cheng et al. |
| 2011/0055256 A1 | 3/2011 | Phillips et al. |
| 2011/0099493 A1 | 4/2011 | Yu et al. |
| 2011/0116538 A1 | 5/2011 | Chuang et al. |
| 2011/0128350 A1 | 6/2011 | Oliver et al. |
| 2011/0129048 A1 | 6/2011 | Barbe et al. |
| 2011/0131498 A1 | 6/2011 | Chao et al. |
| 2011/0141314 A1 | 6/2011 | Liu et al. |
| 2011/0148759 A1 | 6/2011 | Hwang et al. |
| 2011/0148792 A1 | 6/2011 | Hwang et al. |
| 2011/0158441 A1 | 6/2011 | Batra |
| 2011/0161836 A1 | 6/2011 | Mu et al. |
| 2011/0197214 A1 | 8/2011 | Burton et al. |
| 2011/0223893 A1 | 9/2011 | Lau et al. |
| 2012/0019611 A1 | 1/2012 | Wu et al. |
| 2012/0169882 A1 | 7/2012 | Millar et al. |
| 2012/0169883 A1 | 7/2012 | Chang et al. |
| 2012/0223960 A1 | 9/2012 | Chiang et al. |
| 2012/0224021 A1 | 9/2012 | Begeja et al. |
| 2012/0268626 A1 | 10/2012 | Lu et al. |
| 2012/0274736 A1 | 11/2012 | Robinson et al. |
| 2013/0007499 A1 | 1/2013 | Moy |
| 2013/0057642 A1 | 3/2013 | Catchpole |
| 2013/0100352 A1 | 4/2013 | McGowan et al. |
| 2013/0174223 A1 | 7/2013 | Dykeman et al. |
| 2013/0183958 A1 | 7/2013 | Wesby |
| 2013/0194378 A1 | 8/2013 | Brown |
| 2013/0329003 A1 | 12/2013 | Hsia et al. |
| 2013/0335508 A1 | 12/2013 | Mauchly |
| 2014/0012990 A1 | 1/2014 | Ko |
| 2014/0043485 A1 | 2/2014 | Bateman et al. |
| 2014/0043493 A1 | 2/2014 | Bateman et al. |
| 2014/0043495 A1 | 2/2014 | Bateman et al. |
| 2014/0050104 A1 | 2/2014 | Bentley et al. |
| 2014/0098210 A1 | 4/2014 | Larter |
| 2014/0111600 A1 | 4/2014 | Schaefer et al. |
| 2014/0115115 A1 | 4/2014 | Kuang |
| 2014/0184728 A1 | 7/2014 | Kwon |
| 2014/0186026 A1 | 7/2014 | Oshima et al. |
| 2014/0198838 A1 | 7/2014 | Andrysco et al. |
| 2014/0213227 A1 | 7/2014 | Rao |
| 2014/0267560 A1 | 9/2014 | Bright-Thomas |
| 2014/0274203 A1 | 9/2014 | Ganong, III et al. |
| 2014/0313282 A1 | 10/2014 | Ma et al. |
| 2014/0313346 A1 | 10/2014 | Huang et al. |
| 2015/0022636 A1 | 1/2015 | Savransky |
| 2015/0049162 A1 | 2/2015 | Kurupacheril et al. |
| 2015/0078581 A1 | 3/2015 | Etter et al. |
| 2015/0085056 A1 | 3/2015 | Van Broeck |
| 2015/0109399 A1 | 4/2015 | Kuscher et al. |
| 2015/0110259 A1 | 4/2015 | Kaye et al. |
| 2015/0156257 A1 | 6/2015 | Li et al. |
| 2015/0208352 A1 | 7/2015 | Backholm et al. |
| 2015/0254435 A1 | 9/2015 | Fells |
| 2015/0256577 A1 | 9/2015 | Gutierrez Vilaro et al. |
| 2015/0271341 A1 | 9/2015 | Kleiner et al. |
| 2015/0289295 A1 | 10/2015 | Granbery |
| 2015/0319141 A1 | 11/2015 | Jang et al. |
| 2015/0326638 A1 | 11/2015 | Yarygin |
| 2015/0379021 A1 | 12/2015 | Kuper |
| 2016/0007047 A1 | 1/2016 | Hosseini |
| 2016/0050160 A1 | 2/2016 | Li et al. |
| 2016/0057385 A1 | 2/2016 | Burenius |
| 2016/0073055 A1 | 3/2016 | Marsh |
| 2016/0132563 A1 | 5/2016 | Bhandari et al. |
| 2016/0156992 A1 | 6/2016 | Kuper |
| 2016/0173818 A1 | 6/2016 | Su et al. |
| 2016/0173821 A1 | 6/2016 | De Magalhaes |
| 2016/0184726 A1 | 6/2016 | Andersson et al. |
| 2016/0198410 A1 | 7/2016 | Cherniavsky et al. |
| 2016/0205716 A1 | 7/2016 | Wu et al. |
| 2016/0286166 A1 | 9/2016 | Sandvik et al. |
| 2016/0291861 A1 | 10/2016 | Song et al. |
| 2016/0295128 A1 | 10/2016 | Schnittman et al. |
| 2016/0308929 A1 | 10/2016 | Fu et al. |
| 2017/0006162 A1 | 1/2017 | Bargetzi et al. |
| 2017/0019633 A1 | 1/2017 | Shaburov et al. |
| 2017/0041376 A1 | 2/2017 | Lin et al. |
| 2017/0064599 A1 | 3/2017 | Caine et al. |
| 2017/0111600 A1 | 4/2017 | Wang et al. |
| 2017/0163748 A1 | 6/2017 | Shirriff et al. |

(56) References Cited

U.S. PATENT DOCUMENTS

| | | | |
|---|---|---|---|
| 2017/0195008 A1 | 7/2017 | Ko et al. | |
| 2017/0244643 A1 | 8/2017 | Lawrence et al. | |
| 2017/0353907 A1 | 12/2017 | Beattie, Jr. | |
| 2018/0027386 A1 | 1/2018 | Zampini, II | |
| 2018/0077592 A1 | 3/2018 | Kim et al. | |
| 2018/0098036 A1 | 4/2018 | Cassini et al. | |
| 2018/0152736 A1* | 5/2018 | Alexander | H04N 21/41407 |
| 2018/0176508 A1 | 6/2018 | Pell | |
| 2018/0190279 A1 | 7/2018 | Anderson et al. | |
| 2018/0375676 A1 | 12/2018 | Bader-Natal et al. | |
| 2019/0004671 A1 | 1/2019 | Ma et al. | |
| 2019/0028758 A1 | 1/2019 | Talvensaari et al. | |
| 2019/0281096 A1 | 9/2019 | Mazzarella et al. | |
| 2019/0356883 A1 | 11/2019 | Theien et al. | |
| 2020/0145614 A1 | 5/2020 | Gwock | |
| 2021/0029407 A1 | 1/2021 | Hein et al. | |

OTHER PUBLICATIONS

Office Action dated Aug. 21, 2020 for U.S. Appl. No. 16/543,415.
U.S. Appl. No. 16/543,405, filed Aug. 16, 2019.
U.S. Appl. No. 16/543,411, filed Aug. 16, 2019.
U.S. Appl. No. 16/543,415, filed Aug. 16, 2019.
Eileen Burbidge et al. "Google Introduces New Open Format and Developer Tools for Working with BLE Beacons", Disrupt London, https://techcrunch.com/2015/07/14/google-introduces-open-format-and-developer-tools-for-bluetooth-le-beacons/.
Patently Apple. Apr. 13, 2014.http://www.patentlyapple.com/patently-apple/2014/04/when-it-comes-to-ibeacon-readiness-ios-7-idevices-score-87-vs-android-devices-at-a-paltry-25.html.
Wojciech Borowicz et al. "Building Apps in the Age of Beacons and Internet of Things", Mar. 11, 2015 https://uxmag.com/articles/building-apps-in-the-age-of-beacons-and-internet-of-things.
Sarah Perez. Robin, A Company Enabling Sensor-Powered Smart Offices, Raises $1.4 Million. Jul. 7, 2014. https://techcrunch.com/2014/07/07/robin-a-company-enabling-sensor-powered-smart-offices-raises-1-35-million/.
Ron Amadeo, "Meet Google's "Eddystone"—A Flexible, Open Source iBeacon Fighter". Jul. 14, 2015. http://arstechnica.com/gadgets/2015/07/meet-googles-eddystone-a-flexible-open-source-ibeacon-fighter/.
Tips for Having a Great Conference Aver HD Video Conferencing. http://www.averusa.com/video-collaboration/support/video-conferencing-tips.asp. 1991-2015.
VC320. Portable USB Video Conferencing Camera System for Small and Huddle Rooms. 2016.
EVC Series. Meeting collaboration made easy and affordable. http://www.averusa.com/video-collaboration/products/evc-series-video-conferencing.asp. 1991-2015.
AVer VCLink & ScreenShare. http://www.averusa.com/video-collaboration/products/vclink-and-screenshare.asp. 1991-2015.
Portable USB Video Conference Camera System for Small and Huddle Rooms. 1991-2015.
Plug-N-Play USB Video Conference Camera System for Mid to Large Rooms. http://www.averusa.com/video-collaboration/products/vc520-usb-conference-camera.asp. 1991-2015.
Embedded 10-site HD MCU with built-in 18x PTZ Video Conferencing Endpoint. http://www.averusa.com/video-collaboration/products/evc910.asp. 1991-2015.
How to Cut to Different Shots. https://help.getmevo.com/hc/en-us/articles/223725908-How-to-Cut-to-Different-Shots. Sep. 27, 2016.
Enable Face Detection. https://help.getmevo.com/hc/en-us/articles/224041827-Enable-Face-Detection. Sep. 27, 2016.
Edit on the fly. https://getmevo.com/mevoapp. Downloaded Dec. 12, 2016.
So many ways to share. https://getmevo.com/sharing. Downloaded Dec. 12, 2016.
Eileen Burbidge et al. Robin, A Company Enabling Sensor-Powered Smart Offices, Raises $1.4 Million. Jul. 7, 2014. https://techcrunch.com/2014/07/07/robin-a-company-enabling-sensor-powered-smart-offices-raises-1-35-million/.
German Action, Application No. 10 2017 108 589.0 dated Apr. 18, 2018.
Notice of Allowance dated Mar. 10, 2021 for Application No. 16543405.

* cited by examiner

VIDEO CONFERENCE SYSTEM

BACKGROUND

Field

Embodiments of the present disclosure generally relate to video conferencing systems.

Description of the Related Art

Video conferencing has become more popular in recent years, thanks in large part to proliferation of high speed Internet and price reductions in camera equipment. For example, dedicated video conferencing locations exist where rooms and technological resources are dedicated solely to the task of video conferencing. These video conferencing locations can include multiple cameras, microphones, and other peripheral equipment, which can be used to dynamically switch the audio and video transmitted from the video conferencing location during the video conference. This dynamic switching of the audio and video transmitted from the video conferencing location can improve the user experience during the video conference. For example, camera views and audio inputs can be switched, so that the current speaker can be seen and heard more clearly.

However, having multiple camera views and audio inputs comes with the cost of the need for increased data transfer capability, increased number of data channels and/or increased signal processing demands. These increased data transfer requirements and corresponding processing can limit the bandwidth available to transfer and process the desired audio and video for the video conference, which reduces the benefits offered by the ability to dynamically switch between different audio and video inputs.

Therefore, there is a need for an improved video conferencing system that can more efficiently manage the capture, processing, relay, and transmission of audio and video with respect to a video conference environment.

SUMMARY

Embodiments of the disclosure provided herein can be used to improve the control, selection and transmission of data (e.g., audio and video data) to a remote video conferencing environment, by use of a plurality of wired or wirelessly connected electronic devices. For example, the transmission of data from a local environment can be improved by switching the source of visual inputs (e.g., discrete cameras or those incorporated within a display of an electronic device, such as laptop) and/or audio inputs (e.g., discrete or embedded microphones) to the one or more appropriate visual and/or audio sources available within the local environment. The most appropriate visual and audio sources can be the sources that provide the participants in the remote environment the most relevant data giving the remote users the best understanding of the current activities (e.g., discussion, presentation, notes on a whiteboard, etc.) in the local environment.

In one embodiment, a computer implemented method of selecting a source of content data from a plurality of peripheral devices that are positioned in a first environment is provided. The plurality of peripheral devices include a first plurality of peripheral devices that are configured to provide a first content data type. The method includes receiving metadata comprising a data confidence level from at least two peripheral devices of the first plurality of peripheral devices, wherein the at least two peripheral devices include a first peripheral device. The method further includes selecting the first peripheral device as a source for the first content data type based at least in part on a comparison of the data confidence level of the first peripheral device to the data confidence level of one or more other peripheral devices in the first plurality of peripheral devices. The method further includes transmitting, by a conference hub, content data received from the first peripheral device to a remote video conferencing location, wherein the metadata consists of data other than the received content data.

In another embodiment, a system for selecting a source of content data from a first environment to transmit to a remote environment is provided. The system includes a plurality of peripheral devices including a first plurality of peripheral devices that are configured to provide a first content data type; and a controlling device configured to: receive metadata comprising a data confidence level from at least two peripheral devices of the first plurality of peripheral devices, wherein the at least two peripheral devices include a first peripheral device; select the first peripheral device as a source for the first content data type based at least in part on a comparison of the data confidence level of the first peripheral device to the data confidence level of one or more other peripheral devices in the first plurality of peripheral devices; and initiate a transmission of content data from the first peripheral device to a remote video conferencing location, wherein the metadata consists of data other than content data.

In another embodiment, a system for transmitting content data from a first environment to a remote environment. The system includes a first plurality of peripheral devices disposed in a first environment and configured to initiate a transmission of content data from the first environment to a remote environment. The first plurality of peripheral devices includes a controlling peripheral device. Each peripheral device other than the controlling peripheral device is configured to transmit data including a data confidence level to the controlling peripheral device. The controlling peripheral device is configured to select a peripheral device other than the controlling peripheral device or the controlling peripheral device as a source of content data of a first type based on comparing a data confidence level of the controlling peripheral device to data confidence levels received from other peripheral devices, and initiate a transmission of content data of the first type from the selected source to the remote environment.

In another embodiment, a computer implemented method of improving a process for selecting a source of content data from a plurality of peripheral devices that are positioned in a first environment is provided. The plurality of peripheral devices includes a first plurality of peripheral devices that are configured to provide a first content data type. The method includes: receiving, by a controlling device, content data and metadata comprising a data confidence level from a first peripheral device and a second peripheral device of the first plurality of peripheral devices; comparing, by the controlling device, the content data received from the first peripheral device and the second peripheral device, determining there is a data confidence level accuracy issue with one or more of the first peripheral device and the second peripheral device based on analyzing the data confidence levels received from the peripheral devices and the comparison of the received content data; and transmitting, by the controlling device, a notification signal to each peripheral device of the first peripheral device and the second peripheral device for which the data confidence level accuracy issue was determined, wherein the notification signal includes data to notify the peripheral device that there is an accuracy issue with the data confidence level received by the controlling device from the peripheral device.

In another embodiment, a computer implemented method of transmitting content data from one or more of a plurality of peripheral devices that are positioned in a first environment to a remote environment is provided. The plurality of peripheral devices include a first peripheral device and a second peripheral device. The method includes: determining the content data from the first peripheral device has a higher quality than the content data from the second peripheral device based on a comparison of metadata provided from the first peripheral device and the second peripheral device; transmitting content data from the first peripheral device to a conference hub via a first communication link based on determining the content data from the first peripheral device has a higher quality than the content data from the second peripheral device; and transmitting, by the conference hub, the content data from the first peripheral device to a remote video conferencing location, wherein the metadata consists of data other than content data.

In another embodiment, a system for transmitting content data from one or more of a plurality of peripheral devices that are positioned in a first environment to a remote environment is provided. The system includes a conference hub and a plurality of peripheral devices including a first peripheral device and one or more other peripheral devices. A primary peripheral device of the plurality of peripheral devices is configured to compare metadata relating to content data provided from the first peripheral device and the one or more other peripheral devices to determine the content data from the first peripheral device has a higher quality than the content data from the one or more other peripheral devices. The first peripheral device is configured to transmit content data from the first peripheral device to the conference hub via a first communication link based on determining the content data from the first peripheral device has a higher quality than the content data from the one or more other peripheral devices. The conference hub is configured to transmit the content data from the first peripheral device to a remote video conferencing location. The metadata consists of data other than content data.

In another embodiment, a system for transmitting content data from one or more of a plurality of peripheral devices that are positioned in a first environment to a remote environment is provided. The system includes a conference hub and a plurality of peripheral devices peripheral devices including a first peripheral device and a second peripheral device. The conference hub is configured to compare metadata provided from the first peripheral device and the second peripheral device to determine the content data from the first peripheral device has a higher quality than the content data from the second peripheral device. The first peripheral device is configured to transmit content data from the first peripheral device to the conference hub via a first communication link based on determining the content data from the first peripheral device has a higher quality than the content data from the second peripheral device. The conference hub is configured to transmit the content data from the first peripheral device to a remote video conferencing location. The metadata consists of data other than content data.

In another embodiment, a computer implemented method of selecting a source of content data from a plurality of peripheral devices that are positioned in a first environment is provided. The plurality of peripheral devices are in communication with a conference hub and the plurality of peripheral devices include a first peripheral device, a second peripheral device, and a third peripheral device. The method includes transmitting scene data from one or more of the plurality of peripheral devices to one or more of the plurality of peripheral devices via a first communication link during a first time period, wherein the scene data consists of one or more of content data, reduced quality content data, and metadata. The method further includes transmitting content data from the third peripheral device to the conference hub via a second communication link during the first time period, wherein the second communication link and the first communication link are different communication links. The method further includes determining, during the first time period, that the first peripheral device has a better view of a key participant relative to the second peripheral device based on comparing scene data from the first peripheral device and the second peripheral device. The method further includes determining to provide content data of the key participant to a remote video conferencing location during a second time period, the second time period occurring after the first time period. The method further includes transmitting content data from the first peripheral device to the conference hub via the second communication link during the second time period based on the determination that the first peripheral device has the better view of the key participant during the first time period and the determining to provide content data of the key participant during the second time period. The method further includes transmitting, by the conference hub, the content data of the key participant from the first peripheral device to the remote video conferencing location during the second time period.

In another embodiment, a computer implemented method of selecting a source of content data from a plurality of peripheral devices that are positioned in a first environment is provided. The plurality of peripheral devices are in communication with a conference hub and the plurality of peripheral devices include a first peripheral device, a second peripheral device, and a third peripheral device. The method includes transmitting scene data from one or more of the plurality of peripheral devices to one or more of the plurality of peripheral devices via a first communication link during a first time period, wherein the scene data consists of one or more of content data, reduced quality content data, and metadata. The method further includes transmitting content data from the third peripheral device to the conference hub via a second communication link during the first time period, wherein the second communication link and the first communication link are different communication links. The method further includes determining, during the first time period, that the first peripheral device has a better view of a first region relative to the second peripheral device based on comparing scene data from the first peripheral device and the second peripheral device. The method further includes determining to provide content data of the first region to a remote video conferencing location during a second time period, the second time period occurring after the first time period. The method further includes transmitting content data from the first peripheral device to the conference hub via the second communication link during the second time period based on the determination that the first peripheral device has the better view of the first region during the first time period and the determining to provide content data of the first region during the second time period. The method further includes transmitting, by the conference hub, the content data of the first region from the first peripheral device to the remote video conferencing location during the second time period.

A computer implemented method of selecting a source of content data from a plurality of peripheral devices that are positioned in a first environment is provided. The plurality of peripheral devices are in communication with a conference hub and the plurality of peripheral devices include a first peripheral device, a second peripheral device, and a third peripheral device. The method includes transmitting scene data from one or more of the first peripheral device and the second peripheral device via a first communication link during a first time period, wherein the scene data consists of one or more of content data, reduced quality content data, and metadata. The method further includes determining content data from the first peripheral device and the second peripheral device are insufficient for providing quality content data of a key participant during the first time period based on analyzing the scene data from the first peripheral device and the second peripheral device. The method further includes transmitting a request for scene data concerning the key participant to the third peripheral device during a second time period, the second time period occurring after the first time period. The method further includes transmitting scene data from the third peripheral device during the second time period. The method further includes determining content data from the third peripheral device is sufficient for providing quality content data of the key participant during the second time period based on analyzing the scene data from the third peripheral device. The method further includes determining to provide content data of the key participant to a remote video conferencing location during a third time period, the third time period occurring after the second time period. The method further includes transmitting content data from the third peripheral device to the conference hub via a second communication link during the third time period based on the determination that content data from the third peripheral device is sufficient for providing quality content data of the key participant during the second time period and the third time period. The method further includes transmitting, by the conference hub, the content data of the key participant from the third peripheral device to the remote video conferencing location during the third time period.

In another embodiment, a computer implemented method of selecting a source of content data from a plurality of peripheral devices that are positioned in a first environment is provided. The plurality of peripheral devices are in communication with a conference hub and the plurality of peripheral devices include a first peripheral device, a second peripheral device, and a third peripheral device. The method includes transmitting content data derived from data captured by the first peripheral device to a remote video conferencing location during a first time period. The method further includes transmitting scene data from a second peripheral device to a third peripheral device during the first time period. The method further includes determining, during the first time period, that the second peripheral device has a better view of a key participant relative to the third peripheral device based on comparing scene data from the second peripheral device and the third peripheral device. The method further includes transmitting content data derived from data captured by the second peripheral device to the remote video conferencing location during a second time period based on the determining the second peripheral device has a better view of the key participant than the third peripheral device during the first time period and based on determining to provide content of the key participant during the second time period, wherein the second time period occurs after the first time period.

In another embodiment, a computer implemented method of transmitting content data from one or more of a plurality of peripheral devices that are positioned in a first environment to a remote environment is provided. The plurality of peripheral devices include a first peripheral device and a second peripheral device. The method includes determining the content data from the first peripheral device has a higher quality than the content data from the second peripheral device based on a comparison of content data generated by the first peripheral device and content data generated by the second peripheral device. The method further includes transmitting content data from the first peripheral device to a conference hub via a first communication link based on determining the content data from the first peripheral device has a higher quality than the content data from the second peripheral device. The method further includes transmitting, by the conference hub, the content data from the first peripheral device to a remote video conferencing location.

In another embodiment, a system for transmitting content data from one or more of a plurality of peripheral devices that are positioned in a first environment to a remote environment is provided. The system includes a conference hub and a plurality of peripheral devices including a first peripheral device and one or more other peripheral devices. A peripheral device of the plurality of peripheral devices designated as a primary peripheral device is configured to compare content data from the first peripheral device and the one or more other peripheral devices to determine the content data from the first peripheral device has a higher quality than the content data from the one or more other peripheral devices. The first peripheral device is configured to transmit content data from the first peripheral device to the conference hub via a first communication link based on determining the content data from the first peripheral device has a higher quality than the content data from the one or more other peripheral devices. The conference hub is configured to transmit the content data from the first peripheral device to a remote video conferencing location.

In another embodiment, a system for transmitting content data from one or more of a plurality of peripheral devices that are positioned in a first environment to a remote environment is provided. The system includes a conference hub; and a plurality of peripheral devices peripheral devices including a first peripheral device and a second peripheral device. The conference hub is configured to compare content data from the first peripheral device and the second peripheral device to determine the content data from the first peripheral device has a higher quality than the content data from the second peripheral device. The first peripheral device is configured to transmit content data from the first peripheral device to the conference hub via a first communication link based on determining the content data from the first peripheral device has a higher quality than the content data from the second peripheral device. The conference hub is configured to transmit the content data from the first peripheral device to a remote video conferencing location.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the disclosure provided herein can be used to improve the control, selection and transmission of data (e.g., audio and video data) to a remote video conferencing environment, by use of a plurality of wired or wirelessly connected electronic devices. For example, the transmission of data from a local environment can be improved by switching the source of visual inputs (e.g., discrete cameras or those incorporated within a display of an electronic device, such as laptop) and/or audio inputs (e.g., discrete or embedded microphones) to the one or more appropriate visual and/or audio sources available within the local environment. The most appropriate visual and audio sources can be the sources that provide the participants in the remote environment the most relevant data giving the remote users the best understanding of the current activities (e.g., discussion, presentation, notes on a whiteboard, etc.) in the local environment. For example, when a first participant in the local environment begins speaking, the most appropriate audio source may be a first microphone that is closest to the first participant in the local environment, but a few seconds later after another participant starts making a distracting noise (e.g., shuffling papers) near the first microphone, then most appropriate audio source may be a second microphone even though the second microphone is further from the first participant than the first microphone is to the first participant. The following describes how these improvements in selecting the most appropriate visual and audio sources can be achieved.

Figure 1A:
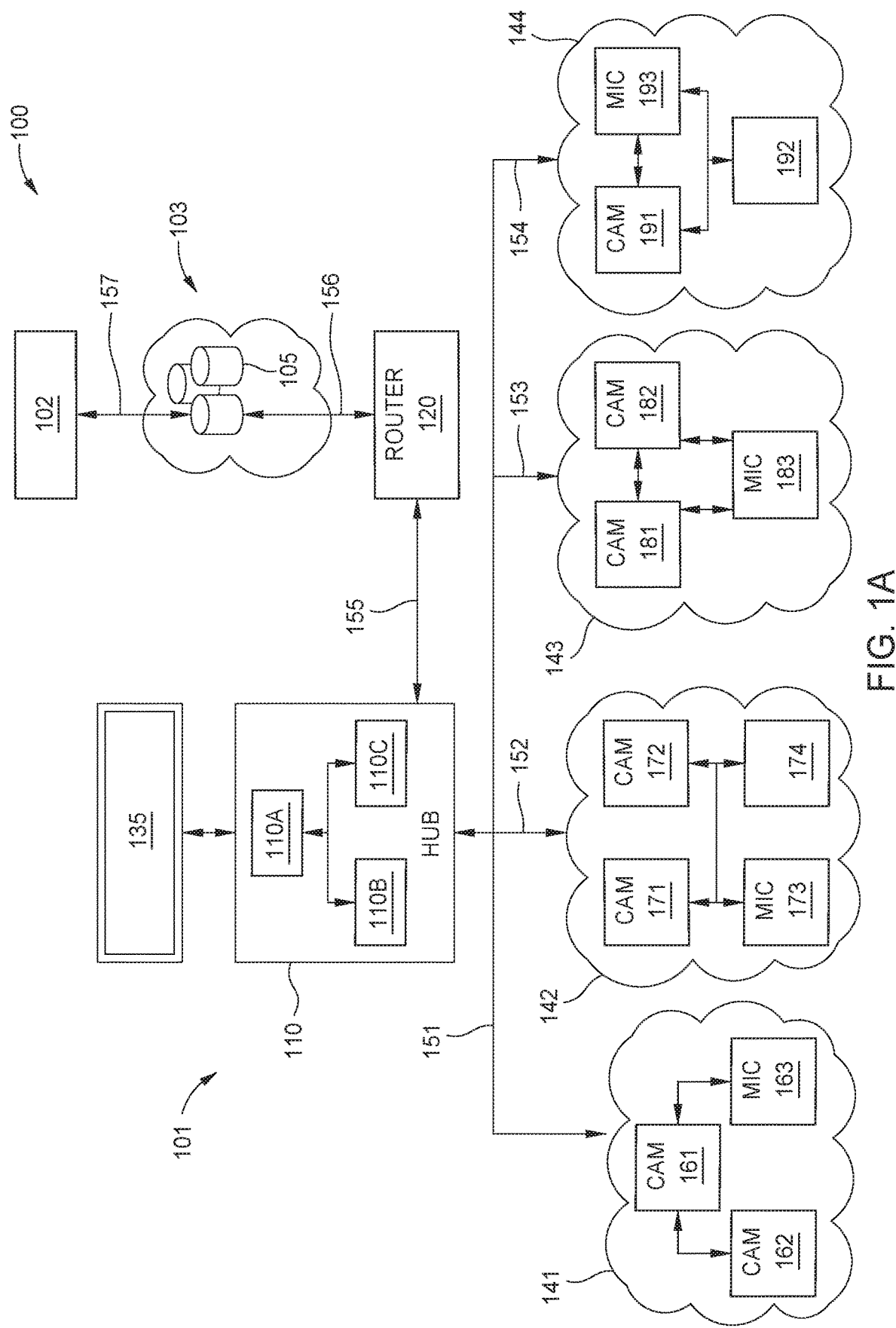
FIG. 1A is a block diagram of a video conferencing system, according to one embodiment.
Figure 1B:
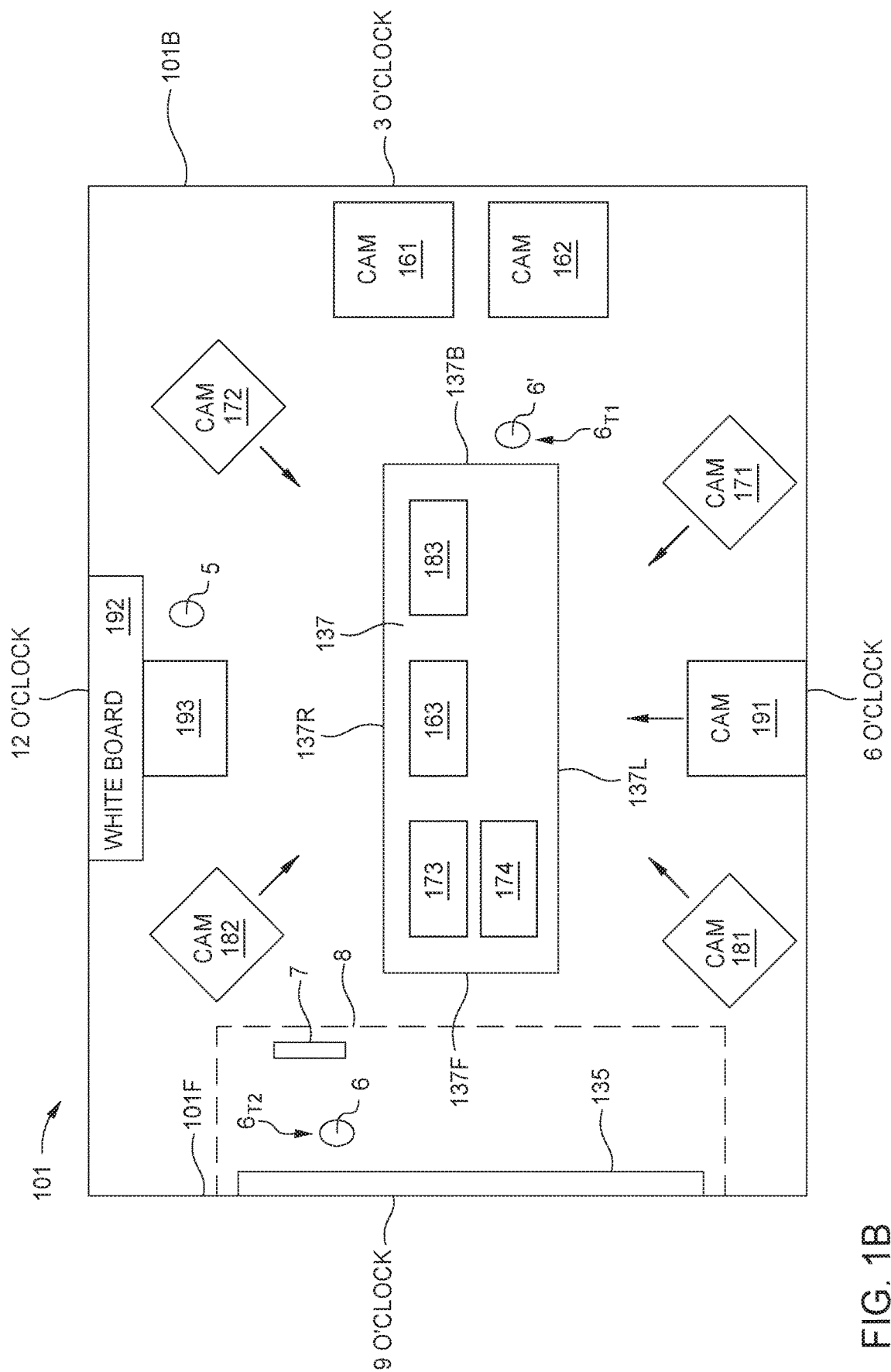
FIG. 1B is a top view of a local environment shown in the video conferencing system of FIG. 1A, according to one embodiment.

FIG. 1A is a block diagram of a video conferencing system 100, according to one embodiment. The video conferencing system 100 includes a local environment 101 (first environment), a remote environment 102 (second environment), and one or more servers 105 accessible on an Internet environment 103. The local environment can be connected with the remote environment 102 and the Internet environment 103 through an Internet-connected router 120. FIG. 1B is a top view of the local environment 101 shown in FIG. 1A, according to one embodiment. A video conference can be executed between the local environment 101 and the remote environment 102 via the Internet environment 103. Furthermore, although the video conference is shown as being executed between the local environment 101 and the remote environment 102 via the Internet environment 103, the connection through the Internet environment 103 is only shown as an example, and the benefits of this disclosure can also be obtained without use of a global computer network, such as the "Internet." For example, in some embodiments, the local environment 101 may communicate to the remote environment 102 across a local area network (LAN), wide area network (WAN) or other network that does not require an Internet connection to communicate. The following describes the video conferencing system 100 with reference to FIGS. 1A and 1B.

The local environment 101 includes a variety of peripheral devices that can be used during a video conference. The peripheral devices in the local environment 101 include devices that can be used to obtain visual and/or audio content (e.g., cameras, microphones, portable electronic devices, laptop computers, and electronic whiteboards) as well as any other sensors (e.g., motion sensor) or other devices (e.g., electrical switches, touch screens, smart televisions, communication equipment, etc.) that can be used to assist in obtaining the visual and/or audio content being generated within the local environment 101. The local environment 101 may include a conference hub 110 that can communicate with the peripheral devices within the local environment 101, for example by receiving audio data, visual data (e.g., video or images), and or other data (e.g., motion detected) from the peripheral devices. The conference hub 110 is configured to communicate with one or more of the peripheral devices by use of wired, wireless, or a combination thereof signal transfer methods using one or more communication links. Additionally, the conference hub 110 can determine and transmit the most appropriate audio and visual data from the peripheral devices of the local environment 101 to the remote environment 102 via a communication link. Although the conference hub 110 is shown in the local environment 101, in some embodiments, the conference hub 110 can be located elsewhere, such as in the Internet environment 103.

The term communication link as used herein generally includes a communication path between two communicating devices (e.g., conference hub 110 and peripheral device, or two peripheral devices) that uses a communication protocol (or communication standards) to facilitate the communication between the devices, and may be formed by use of a wired and/or wireless technique. Communication protocols that may be used may include, but are not limited to Bluetooth, Bluetooth low energy (BLE), Infrastructure Wireless Fidelity (Wi-Fi), Soft Access Point (AP), WiFi-Direct, Address Resolution Protocol (ARP), ANT UWB, ZigBee, Wireless USB, or other useful personal area network (PAN), wide area network (WAN), local area network (LAN), wireless sensor network (WSN/WSAN), near field communication (NFC) or cellular network communication protocols.

The peripheral devices of the local environment 101 can be arranged in a plurality of clusters, which are each in communication with the conference hub 110 by use of a communication link to reduce the amount of data that is transferred to and processed by the conference hub 110. The communication link may be formed by use of a wired and/or wireless technique. The peripheral devices in each cluster may communicate with each other using a wired and/or wireless technique, and the peripherals within a cluster may communicate via multiple, or different communication techniques. For example, in FIG. 1A, the peripheral devices of the local environment 101 are arranged in four clusters 141-144. Each cluster 141-144 can communicate with the conference hub 110 over a respective communication link 151-154. Often a single peripheral device of a given cluster can be used to directly communicate with the conference hub 110, which reduces the number of peripheral devices that the conference hub directly communicates with during a video conference. Furthermore, the single peripheral device in the given cluster can determine that it is desirable to send less data to the conference hub 110 relative to the amount of data received by the single peripheral device from the other peripheral devices in the given cluster.

The conference hub 110 can further communicate to the router 120 over a communication link 155. The router can be connected to the Internet environment 103 through a communication link 156, and the remote environment 102 can be connected to the Internet environment through a communication link 157. The communication links 151-157 can include wired and/or wireless communication links, as discussed herein. Furthermore, the various communication links amongst devices and clusters described herein may be discrete or shared.

Each peripheral device of a given cluster can communicate with some or all of the other peripheral devices of that cluster, for example using a peer-to-peer arrangement or a master-slave arrangement, each of which can be a wired and/or wireless form of communication. In some embodiments, the master-slave architecture of a cluster is used so that only one peripheral device (i.e., master, also referred to as a primary peripheral device) of the cluster of peripheral devices communicates directly with the conference hub 110 over the respective communication link for that cluster. Furthermore, the master device of a cluster can aggregate the data received from the other peripheral devices in that cluster before transferring data to the conference hub 110.

In general, each of the peripheral devices described herein may include a processor (e.g., central processing unit (CPU), a digital signal processor (DSP), and/or application-specific integrated circuits (ASIC)) that is able to execute software programs stored in non-volatile memory (not shown) so as to perform various processes based on a peripheral device's designed functionality. The software applications include program code (e.g., algorithms) that may be executed by processor in order to perform various functionalities associated with receiving and analyzing data (e.g., audio and/or visual data) received from sources within the local environment, perform some logic operations and/or communication with other peripheral devices and the conference hub. The memory may also include stored media data that includes various data files, settings and/or parameters associated with the local environment, peripheral devices and/or the conference hub 110 that can be used by a software application to perform one or more of the methods described herein.

The communication links 151-154 are shown between the conference hub 110 and the clusters 141-144 instead of an individual device because the specific device of a cluster that communicates with the conference hub 110 may switch over time. For example, the first cluster 141 includes a first peripheral device 161 (e.g., a wide angle camera) and a second peripheral device 162 (e.g., a pan-tilt-zoom (PTZ) camera). Continuing the example, at the beginning of a video conference, the conference hub 110 may communicate directly with the first peripheral device 161, while at the end of the video conference, the conference hub 110 may be communicating directly with the second peripheral device 162 instead of the first peripheral device 161.

Referring to FIGS. 1A and 1B, the local environment 101 can further include a main display 135 and a conference table 137 at which users can sit during a video conference. During the video conference, users in the local environment 101 can look at the main display 135 located on a front wall 101F of the local environment 101. The main display 135 can be used to display visual data from the remote environment 102 (e.g., visual data of the participants at the remote environment 102) as well as other data relevant to the video conference, such as notes from a whiteboard or a presentation on an electronic device located at either environment 101, 102 or another location. The conference table 137 includes a right side 137R, a left side 137L, a front 137F, and a back 137B. The following paragraphs describe the peripheral devices of each cluster 141-144, so that the improvements of transmitting audio and video data from the local environment 101 to the remote environment 102 can be more easily understood.

The first cluster 141 can be used to obtain audio and visual data to provide an overview of the local environment 101. The first cluster 141 includes a wide angle camera 161, a PTZ camera 162, and an overview microphone 163. For example, in one embodiment, the cameras 161, 162 can be located on a back wall 101B of the local environment 101, so that the wide angle camera 161 can capture an overview of the local environment 101 while the PTZ camera 162 can pan, tilt, and zoom to a specific location (e.g., the location of a given speaker) of the overview captured by the wide angle camera 161. This overview generally includes a view of the conference table 137 and can be useful, for example to see all of the participants in the local environment 101 for the video conference. The PTZ camera 162 can be useful, for example, if a current speaker is standing in the front of the local environment 101 or seated at the head of the front 137F of the conference table 137. The overview microphone 163 can be located in an area likely to receive adequate audio input during most conferences, such as over the conference table 137. The first cluster 141 can communicate with the conference hub 110 and/or the other clusters 142-144 using the first communication link 151.

The microphones in the local environment 101 (e.g., overview microphone 163) can be any type of electrical device that is able to convert pressure variations of a sound wave into an electrical signal, and thus may include, but are not limited to a dynamic microphone, condenser microphone, piezoelectric microphone, fiber optic microphone, ribbon microphone, MEMS microphone or other similar device. In some embodiments, the microphones in the local environment 101 can be omnidirectional microphones that are able to detect audible signals from multiple directions.

The second cluster 142 can be used to obtain audio and visual data of the front 137F of the conference table 137 located in the local environment 101. The second cluster 142 can include a front right camera 171, a front left camera 172, a front microphone 173, and a portable electronic device 174. In some embodiments, each camera in the local environment 101 can be a PTZ camera except for in some of these embodiments, the wide-angle camera 161. The front right camera 171 can be directed to view the front right side of the conference table 137. The front left camera 172 can be directed to view the front left side of the conference table 137. The front microphone 173 can be positioned to receive audio at the front 137F of the conference table 137. The portable electronic device 174 can be located at the front 137F of the conference table 137 in FIG. 1B, but the portable electronic device 174 can move or be moved throughout a video conference. In some embodiments, the portable electronic device 174 can be configured to join one of the clusters 141-144 based on the position of the portable electronic device 174 within the local environment 101. The portable electronic device 174 can be a tablet computing device, a laptop computer, a cell phone (e.g., smart phone), or another similar electronic device. The second cluster 142 can communicate with the conference hub 110 and/or the other clusters 141, 143, 144 using the second communication link 152.

The third cluster 143 can be used to obtain audio and visual data of the back of the conference table 137 located in the local environment 101. The third cluster 143 can include a back right camera 181, a back left camera 182, and a back microphone 183. The back right camera 181 can be directed to view the back right side of the conference table 137. The back left camera 182 can be directed to view the back left side of the conference table 137. The back microphone 183 can be positioned to receive audio at the back of the conference table 137. The third cluster 143 can communicate with the conference hub 110 and/or the other clusters 141, 142, 144 using the third communication link 153.

The fourth cluster 144 can be used to obtain audio and visual data of a whiteboard area located in the local environment 101. The fourth cluster 144 can include a whiteboard camera 191, an electronic whiteboard 192, and a whiteboard microphone 193. The whiteboard camera 191 can be directed to view the whiteboard 192 and surrounding area. The whiteboard microphone 193 can be positioned to receive audio around the whiteboard 192. In some embodiments, the electronic whiteboard 192 can include sensors and other inputs to obtain input data to determine when a user is standing at the whiteboard 192, writing on the whiteboard 192, or otherwise interacting with the whiteboard 192 (e.g., adjusting settings of the whiteboard 192). Furthermore, in some embodiments, the data transferred from the whiteboard 192 can further include the contents (i.e., a digitized version of the contents) written on the whiteboard 192. This data can be transmitted to the conference hub 110, other peripherals within the fourth cluster 144, and/or the other clusters 141-143. The fourth cluster 144 can communicate with the conference hub 110 and/or the other clusters 141-143 using the fourth communication link 154.

Peripheral Devices

In some embodiments, the peripheral devices of the different clusters 141-144 periodically transfer data to the conference hub 110. The data transferred from the peripheral devices to the conference hub 110 can include one or more of (1) the type of device (e.g., camera, microphone, laptop, etc.) transmitting or generating the transmitted data, (2) the content data type (e.g., visual content data, audio content data), (3) a data confidence level (described in further detail below) of the data being transferred, and (4) the content of the data (hereafter referred to as "content data") transmitted by the peripheral device (e.g., visual data recorded by a camera, audio recorded by a microphone, contents displayed by a portable electronic device, etc.). The data transferred from the peripheral device concerning the type of device, the content data type, data collection preference ranking, the data confidence level and other data characterizing the content data can also referred to as metadata and can be used by the conference hub 110 to determine the one or more most appropriate sources for a given type of content data (e.g., audio, visual, or combination) to transfer to the remote environment 102. Furthermore, due to the smaller size of metadata files relative to the content data, when a peripheral device transfers only the metadata as opposed to transferring the actual content data, network congestion is reduced and the computational load on the conference hub 110 is reduced. Other examples of metadata characterizing the content data can include data indicating whether visual data includes a current speaker or key person (e.g., important client), data indicating that audio content includes unwanted noise (e.g., rattling bag of potato chips) or distracting video (e.g., a person making the distracting noise or repetitive movements, such as tapping a pencil on the table or a person moving large equipment or supplies), scene quality data indicating quality of the content, such as levels of glare in video content, levels of background noise in audio content, or one of the other examples provided below describing quality of audio data and quality of visual data. In some embodiments, the quality of audio data or visual data may be analyzed and determined by a comparison of the audio data or visual data received from the various peripheral devices by use of one or more analysis techniques. The quality of audio data can be determined based on a number of factors that may include correlation with a video image, decibel level, signal-to-noise ratio, pattern recognition, or other similar audio signal quality based parameters. The quality of visual data can be determined by use of analysis techniques that include analytical models (e.g., pixel-based methods, parametric methods, bitstream methods or hybrid methods) that analyze the visual data quality based on the information provided in one or more frames in the visual data that is being analyzed and compared, person detection, face and/or gaze detection, detection of number of people, object detection, motion detection, scene analysis (field of view, white balance, color rendering, glare detection, etc).

In some embodiments, metadata is also not limited to peripheral devices and can include cluster level data. For example, metadata at a cluster level can include the data identifying the number of devices in the cluster, the architecture of the cluster (e.g., master-slave relationship, ring communication relationship, or other device interconnection scheme or device hierarchy), or cluster-to-cluster relationship (e.g., data received at a given cluster from another cluster).

Each peripheral device within the different clusters 141-144 can determine when to transmit data (metadata and/or content data) between peripheral devices or to the conference hub 110 based on the input received at the given peripheral device. This input can include content data (e.g., audio recorded by a microphone or visual data recorded by a camera) captured by the peripheral device as well as data communicated to the peripheral device (e.g., a microphone may receive data regarding the status of other microphones in the local environment 101). For example, the overview microphone 163 may transmit audio content received at the overview microphone 163 based on determining that the received audio is above a specified threshold (e.g., a decibel level) and based on determining from a communication received from the conference hub 110 or other peripheral device that the audio data available from the overview microphone 163 has a higher quality (e.g., higher decibel level, low signal-to-noise ratio, etc.) than audio data from one or more of the other microphones within the local environment 101.

Furthermore, each peripheral device can adjust the data transmitted to the conference hub 110 or other peripheral device based at least in part on the content data received at and/or generated by the given peripheral device. These adjustments can include what data is transmitted and how often data is transmitted. In some embodiments, each peripheral device can use the content data received at and/or generated by the peripheral device to determine a data confidence level for the peripheral device. The data confidence level for a peripheral device in general can be used to quantify (e.g., on a zero to 1.0 scale with 1.0 being the highest confidence) how confident the peripheral device is about the relevance of the data captured by the peripheral device to a video conference occurring in the local environment 101. Each peripheral device can be configured with different settings and/or algorithms for determining its data confidence level. A variety of factors can be used for determining data confidence levels for different peripheral devices including but not limited to the following factors: (1) an audio data factor that includes audio level of speech, speech from a particular user, position of a speaker relative to the audio capturing device and/or interfering noise received by a microphone; (2) a visual data factor that includes motion of a participant, tracking of movement or position of a participant or current speaker, and facial recognition of a key participant (e.g., an important client attending a meeting) using a camera; and (3) a user interaction data factor that includes input related to a user's interaction with an electronic device, such as clicking to the next slide on the portable electronic device 174 or writing on the electronic whiteboard 192. In general, the variety of factors used to determine a data confidence level relate to attributes of the content data (e.g., audio data factors, visual data factors and/or user interaction data factors) that are currently being collected, were recently collected (e.g., collected within the last second, minute or even tens of minutes) or were previously collected (e.g., not within the current video conference) by the peripheral device.

The "age" of a factor can also affect the data confidence level. For example, the "age" can be how recent the factor (e.g., speech) was detected and can be used to adjust the data confidence level for the data received from a peripheral device. The data confidence level applied to data transmitted from a peripheral device can begin to decay as time continues if, for example, detection of the factor does not continue, such as a data confidence level for a microphone dropping from 0.7 to 0.65 after 10 seconds of not detecting additional speech above a designated decibel level.

The determined data confidence level for a peripheral device can be used to adjust the data transmitted from the peripheral device. For example, if the overview microphone 163 is receiving a low level of audio, then the overview microphone can determine that the data received at that time has a data confidence level below 0.4 on a zero to 1.0 scale. The overview microphone 163 can then determine that it should not transmit any audio content data to another device that it is currently in communication with or can communicate with at that time. The microphone 163 may transmit metadata, such as the data confidence level data, so that other devices have information about the general status of the overview microphone 163.

If the overview microphone 163 is receiving a mid-level of audio resulting in a data confidence level between 0.4 and 0.7, then the overview microphone 163 can determine to transmit a first set of data to another peripheral device in a cluster or the conference hub 110. This first set of data can include the metadata described above (i.e., the type of device, content data type, and data confidence level), audio content data and/or other data. In some embodiments, this first set of data does not include the audio content data from the overview microphone 163, which can reduce the amount of data transferred within the first cluster 141 as well as the amount of data transferred to the conference hub 110. In other embodiments, the first set of data can include a low-resolution version of the audio content captured by the overview microphone 163. Furthermore, in some embodiments, the overview microphone 163 may determine that it is desirable to transfer the received audio content data or a higher resolution version of the audio content data upon receiving a command to transfer the received audio data. For example, the conference hub 110 may receive a data confidence level of 0.6 from the overview microphone 163, and upon determining that this is the highest data confidence level or one of the highest data confidence levels received from any of the microphones, a request may be sent from the conference hub 110 to the overview microphone 163 for the overview microphone 163 to transmit the high-resolution audio content data from the overview microphone 163 despite the data confidence level being below 0.7.

If the overview microphone 163 is receiving a high-level of audio resulting in a data confidence level greater than 0.7, then the overview microphone 163 can determine to transmit a second set of data. In some embodiments, this second set of data can include the audio content data (e.g., high-resolution audio content data) from the overview microphone 163 and some or all of the data described above, such as the metadata. If the conference hub 110 is receiving higher quality audio from other microphones, then conference hub 110 may send a request to the overview microphone 163 to stop transmitting the audio signal received at the overview microphone 163 or to instead transmit low-resolution audio content data despite the data confidence level being greater than 0.7 at the overview microphone 163, which can help preserve bandwidth and processing resources for the higher quality audio data from other microphones. Overall, in some embodiments, peripheral devices can be configured to adjust the resolution of the content data provided by the peripheral device based on the data confidence level determined by the peripheral device and/or the data received from the conference hub 110. For example, the overview microphone 163 could be configured to send a low-resolution version of audio content when a mid-level data confidence level is determined by the overview microphone 163 and a send a high-resolution version of audio content when a high-level data confidence level is determined by the overview microphone 163.

Although the example above describes how a data confidence level can be adjusted for a microphone (i.e., overview microphone 163), a similar process can be used by other peripheral devices that transmit visual data (e.g., video) or audio and visual data, such as cameras, portable electronic devices, and the electronic whiteboard. Non-limiting examples can include that the data confidence level determined by a camera may (1) increase when the camera is recording video conference participants (i.e., people in the local environment 101), (2) further increase when one or more participants are facing the camera, (3) further increase when a current speaker is in the field of view of the camera, (4) further increase when the current speaker is facing the camera, and (5) increase further when the camera or another camera can determine that other participants in the video conference are looking at the current person who is talking within local environment 101 and who is in the field of view of the camera.

The data confidence level determined by the portable electronic device 174 can increase when a user is interacting with the portable electronic device 174, for example when a click, imparted motion or keystroke is recently received at the portable electronic device 174. Furthermore, the data confidence level determined by the portable electronic device 174 can increase when an application (e.g., Power-Point™) typically used for presentations is displayed on the portable electronic device.

The data confidence level determined by the electronic whiteboard 192 can (1) increase based on determining a user is located near the electronic whiteboard 192 and (2) increase or further increase based on determining a user is interacting with the electronic whiteboard 192, for example by writing on the electronic whiteboard 192, gesturing towards the electronic whiteboard 192, or speaking at the electronic whiteboard 192. In some embodiments, the data confidence level determined for a particular peripheral device can be based on data received from the particular peripheral device as well as data received from other peripheral devices. For example, the electronic whiteboard 192 may determine that a user is standing at the electronic whiteboard 192 with a proximity sensor or a motion sensor, and data from the whiteboard camera 191 or camera from another cluster (e.g., front right camera 171) may be used to determine that the user who is standing at the electronic whiteboard 192 is also gesturing towards the electronic whiteboard 192, which can be used to increase the data confidence level for the electronic whiteboard 192 relative to a case where the electronic whiteboard 192 was just used to determine its data confidence level. In some embodiments, data from one of the cameras (e.g., the whiteboard camera 191 or the front right camera 171) can be sent to electronic whiteboard 192 to perform additional processing. For example, if a camera detects activity near the electronic whiteboard 192 and transmits data identifying this activity to the electronic whiteboard 192, then the electronic whiteboard 192 can exit a sleep mode and run a process to update the status of all of its inputs (e.g., update status of motion sensor, proximity sensor, digitize the contents written on the whiteboard). The electronic whiteboard 192 can process these updates from the inputs and determine whether to change the type and/or amount of data being transmitted to the conference hub 110 from the electronic whiteboard 192.

Similarly, if the electronic whiteboard 192 detects activity, the electronic whiteboard 192 can transmit data to cameras commonly used to record visual data of the area around the electronic whiteboard 192, such as the cameras 171, 181, 191. Upon receiving the data, these cameras 171, 181, 191 can alter the internal processing performed by the camera or a signal can be transmitted to another device (e.g., the conference hub 110) by one of the cameras or the electronic whiteboard 192, so that the visual data from that camera can be analyzed more closely. For example, in one embodiment, upon receiving a status signal from the electronic whiteboard 192 indicating activity around the electronic whiteboard 192, the whiteboard camera 191 may change from executing in a low-resolution mode to executing in a high-resolution mode. In another embodiment, upon receiving a status signal from the electronic whiteboard 192 indicating activity around the electronic whiteboard 192, the conference hub 110 may perform additional processing on the visual data (e.g., video content) received from one or more of the cameras 171, 181, 191. This additional processing can include but is not limited to running tracking software on the visual data received from these cameras, allocating larger areas of memory for the visual data from these cameras (e.g., to ensure there is enough room in buffers and/or storage for the video content from these cameras), and performing additional analysis on the audio content received around the electronic whiteboard 192 in an effort to determine which camera 171, 181, 191 may be most appropriate to select for displaying the activity around the electronic whiteboard 192.

Clusters

In some embodiments, only one peripheral device in each cluster 141-144 communicates directly with the conference hub 110. In the following discussion a peripheral device in a cluster, which communicates directly with the conference hub 110, is referred to as the master, or master device, while the other peripheral devices in the cluster are referred to as slaves. In some embodiments, the master devices receives data from each of the devices within the cluster and then decide based on an algorithm running on the device which of the devices within the cluster, including itself, has received the most relevant information (e.g., highest data confidence level data) that should be transferred to the conference hub 110. The particular peripheral device of a cluster that acts as the master can be static or dynamic, and in other words will not change over time (static) or can change at any given time (dynamic). For example, the peripheral devices of the first cluster 141 can be configured in a static arrangement with the wide angle camera 161 being the designated master that communicates directly with the conference hub 110 throughout a video conference.

On the other hand, the peripheral devices of the first cluster 141 can be configured in a dynamic arrangement in which the peripheral device performing as the master switches over time, such as during the course of a video conference. In one embodiment, the peripheral device of a cluster that maintains the highest data confidence level for a period of time (e.g., one minute) or highest data confidence level averaged over a most recent period of time (e.g., one minute) is determined to be the master. In some embodiments, the peripheral device with the highest data confidence level in the cluster is more likely to be transferring a larger amount of data than other peripheral devices in the cluster. Thus, by selecting the peripheral device of a cluster that is more likely to be transferring a largest amount of data in the cluster as the master, the overall latency of communication between the cluster and the conference hub 110 can be reduced. This overall latency can be reduced since this larger amount of data only needs to be transferred between the master and the conference hub 110. In another embodiment, the peripheral device selected as the master can be determined based on the type of device. For example, because a camera may transfer a much larger amount of data than a microphone, a cluster including two cameras and a microphone may determine to only dynamically switch between having one of the two cameras being selected as the master. In another embodiment, the device transmitting the largest amount of data is selected as the master.

The peripheral device of a cluster selected as the master can transfer to the conference hub 110 the last received data confidence level of each of the peripheral devices in the cluster. In some embodiments, the highest data confidence level of the data received by all the peripheral components in the cluster can be used to determine how frequently the master device transmits the desired data to and/or communicates with the conference hub 110. For example, if the highest data confidence level in a cluster is in a low range (e.g., below 0.4), then the master may determine to only intermittently communicate with the conference hub 110 at a first fixed interval of time, such as every 30 seconds, or determine to not communicate to the conference hub 110 based on the low data confidence levels. Additionally, if the highest data confidence level in a cluster is in a medium range (e.g., between 0.4 and 0.7), then the master may communicate with the conference hub 110 at a second fixed interval of time, such as every 1 second or the master may communicate with the conference hub 110 using a speed that is necessary to transfer low-resolution content data, such as a low-resolution visual data from a camera in the cluster, or a low-resolution audio signal from a microphone in the cluster, or a low-resolution visual data and audio signal from the camera in the cluster. Furthermore, if the highest data confidence level in a cluster is in a high range (e.g., greater than 0.7), then the master may communicate with the conference hub 110 using a data transfer speed necessary to transfer high-resolution content data (e.g., visual data from one or more cameras).

As discussed above, the content data transferred or not transferred by a device within the cluster, such as the master, to the conference hub 110 can also be affected by input received from the conference hub 110. For example, a given cluster may send high-resolution visual data to the conference hub 110 despite the highest data confidence level for a camera in the cluster being in a low-range or mid-range, for example, because the data confidence level associated with visual data from the cameras in other clusters is not any higher than the low-range or mid-range data confidence levels determined for the given cluster.

Although the peripheral devices are shown arranged in the clusters 141-144 with each peripheral device belonging to a single cluster, in some embodiments one or more of the peripheral devices can belong to two or more clusters. For example, in some embodiments the fourth cluster 144 focusing on the whiteboard area can further include the front right camera 171 and the back right camera 181 as these cameras may obtain a better view of the current speaker in the whiteboard area than the whiteboard camera 191 causing the front right camera 171 and the back right camera 181 to each belong to two clusters. In other embodiments, all cameras can be arranged in a cluster and all microphones can be arranged in a cluster, for example, in addition to the clusters 141-144 shown in FIG. 1A. Arranging all cameras in a cluster can be useful for communicating information, such as identifying which camera has the best view of a key participant (e.g., important client). For example, if the front right camera 171 has a high-quality view of the key participant, then data indicating this high-quality view can be sent to the other cameras in the cluster, so that these cameras can reduce processing requirements associated with searching for the key participant. Furthermore, when the front right camera 171 loses the high quality view of the key participant or the visual data quality of the key participant is reduced, data can be transmitted from the front right camera 171 to other cameras to search for the key participant. In some embodiments, the cameras can use Address Resolution Protocol (ARP) to facilitate the communication of information between the cameras, such as which camera has the best view of an object or person. Similarly, other peripheral devices, such as microphones, can use ARP to facilitate the communication of information between the microphones, such as which microphone is receiving the best audio signal of the current speaker or a key participant. Furthermore, different types of peripheral devices can also use ARP to facilitate the communication of information, such as a data packet communicated between a camera and an electronic whiteboard.

In other embodiments, subsets of peripheral devices of a given type (e.g., cameras) can be arranged together in a cluster. For example, it may be useful to include all cameras on the left wall (i.e., cameras 171, 181, 191) when activity is detected near the electronic whiteboard 192. In some embodiments, arranging the cameras 171, 181, 191 in a cluster can allow the cameras to directly communicate with each other, which can reduce processing demands on the conference hub 110 and other peripheral devices. In other embodiments, two or more clusters can be clustered together in various arrangements (e.g, ring, star, etc,), for example with the masters of each cluster communicating to one or more of the other masters, and one or more of the masters communicating with the conference hub 110.

In another embodiment, a dynamic cluster can be formed in addition to clusters having more static arrangements, such as the clusters 141-144 described above. For example, a dynamic cluster can be formed around the current speaker or key participant, such as a dynamic cluster including the two or more cameras having the highest quality views of the current speaker and the two or more microphones capturing the highest quality audio from the current speaker or key participant. The peripheral devices included in this dynamic cluster can then switch over time as the current speaker or key participant moves throughout the local environment 101. Dynamic clusters can also be formed and/or saved for one or more recent speakers (e.g., a speaker within the last minute or five minutes or speaker who spoke for more than a given duration, such as ten seconds or one minute). Saving a dynamic cluster for a recent speaker can be useful as recent speakers are often likely to speak again and are often located in the same position (e.g., a same seat at a conference table) as the last time the recent speaker spoke.

Furthermore, in some embodiments a peripheral device (e.g., a master in a given cluster) can perform any task performed by the conference hub 110, such as tasks discussed below in the next section. For example, in some embodiments a master of a cluster may receive visual data content from two or more cameras and determine to only send visual data content from one of the video cameras to the conference hub 110. As another example, a peripheral device in a given cluster may request a microphone to send high quality audio content despite the microphone having a low data confidence level. In another embodiment, a peripheral device communicating to multiple cameras and multiple microphones can determine to relay only a single stream of audio content and a single stream of visual data content to the conference hub 110 based on one or more factors, such as data confidence levels or other metadata described above. In other embodiments, a peripheral device (e.g., the master of a cluster) can alter the metadata received from the other peripheral devices in the cluster. For example, a master peripheral device may transmit less metadata to the conference hub 110 than the amount of metadata received at the master peripheral device. A master peripheral device may generate additional metadata based on the metadata received from other peripheral devices. For example, the master peripheral device may receive metadata from multiple cameras and multiple microphones. The master peripheral device can then generate additional metadata to transmit to the conference hub, such as the number of cameras, or the number of cameras with a high data confidence level. In another embodiment, the master peripheral device may alter the metadata received from the peripheral devices of the cluster. For example, as discussed in further detail below, a correction factor can be applied to the data confidence level supplied by a peripheral device, and this instance the master peripheral device can apply this correction factor to the data confidence level of the peripheral device. Then the master peripheral device can transmit the corrected data confidence level to the conference hub 110.

In many embodiments, communication between peripheral devices can be arranged to be bi-directional, such as each peripheral slave device in a cluster transmitting data to and receiving data from the master of the cluster. However, in some embodiments, to reduce processing demands on one or more of the peripheral devices, one or more portions of a communication path can be arranged to be uni-directional, such as peripheral devices transmitting data to a master without the master transmitting data to the slaves of the cluster. In some of these embodiments, the arrangement to use uni-directional transmission of data may be dynamic or static. In a dynamic arrangement, a determination to switch from bi-directional can be based on factors, such as processing loads placed on a given peripheral device, such as the master of a cluster or recurring time periods. For example, updates from a master to a peripheral device of a cluster may only be transmitted every 30 seconds while data is sent from each peripheral slave device in the cluster to the master continuously or on a shorter time period, such as every 50 ms.

In some embodiments, scene data (i.e. content data, reduced quality content data (e.g., content data that has a lower resolution, such as 720p versus 1080p video resolution and/or audio data resolution), metadata, or other related data) are transferred between peripheral devices, the peripheral devices and the conference hub 110, or the master peripheral device and the conference hub 110, using different communication links to reduce the amount of data transmitted on a single communication link.

Conference Hub

Although the following describes the conference hub 110 as a separate electronic device that is not also a peripheral device, in some embodiments, a peripheral device (e.g., a camera) can perform all of the tasks described below as being performed by the conference hub 110. In such embodiments, a particular peripheral device may be configured to communicate to each peripheral device, at a given location, either directly or indirectly (e.g., by communicating to a peripheral device in each cluster at the given location). Furthermore, in such embodiments, a separate conference hub 110 would not be required. In general, (1) a peripheral device performing the tasks described below as being performed by the conference hub 110, (2) a peripheral device acting as the master of a cluster, and (3) the conference hub 110 can also be referred to as a controlling device. Additionally, a controlling device can be referred to as a controlling peripheral device when the device is also a peripheral device. Moreover, any controlling device can initiate a transmission of content data to the remote environment 102 regardless of whether the communication passes through other electronic devices in the local environment 101.

The conference hub 110 can determine the data to transfer to the remote environment 102 by analyzing the data received from each of the clusters 141-144. The data transferred from the peripheral devices of different clusters 141-144 to the conference hub 110 can include the metadata described above (i.e., the type of device, content data type, and data confidence level for the peripheral device) and the content data (e.g., visual data recorded by a camera, audio recorded by a microphone, contents displayed by portable electronic device, etc.). The metadata transferred from the peripheral device of the different clusters 141-144 can be used by the conference hub 110 to determine the one or more most appropriate sources (e.g., overview microphone 163, whiteboard camera 191, etc.) for a given content data type (e.g., audio or visual) to transfer to the remote environment 102. For devices that can transfer both audio and visual data (e.g., the portable electronic device), these devices can be selected as a source for audio data, visual data, or both.

For example, the local environment 101 includes seven different cameras, and the conference hub 110 may determine that the front left camera 172 is the most appropriate source of visual data to transfer to the remote environment 102 based on the front left camera 172 having the highest data confidence level of the seven cameras in the local environment 101. Furthermore, continuing the example, the conference hub 110 may determine that the overview microphone 163 is the most appropriate source of audio to transfer to the remote environment 102 based on the overview microphone 163 having the highest data confidence level of the four microphones in the local environment 101. Thus, the source of audio and video data may come from different clusters, such as the audio source coming from the overview microphone 163 of the first cluster 141 and the video source coming from the left camera 172 of the second cluster 142.

In some embodiments, the conference hub 110 can use criteria other than the data confidence level received from each peripheral device to determine the most appropriate sources of audio and visual content. For example, in one embodiment, the conference hub 110 can factor in the received audio content to assist in determining the most appropriate camera to use as the visual source to transmit to the remote environment 102. For example, the conference hub 110 may determine to use the back right camera 181 as the visual feed to transmit to the remote environment 102 instead of the front right camera 171 based on the back microphone 183 receiving a stronger audio signal than the front microphone 173 despite the front right camera 171 having a higher data confidence level than the back right camera 181.

Furthermore, in some embodiments, the conference hub 110 can include adjustments (e.g., adjustments executed by software running on the conference hub 110) to normalize the data confidence levels received from different peripheral devices (e.g., cameras from different manufacturers), so that a comparison of data confidence levels between two peripheral devices is more useful. For example, it may be observed that a view from the back right camera 181 at a data confidence level of 0.7 is generally more useful than a view from the front right camera 171 at a data confidence level of 0.8. Thus, the conference hub 110 may determine to add a correction factor to the data confidence level of the back right camera 181 of, for example 0.11, when a comparison of the data confidence levels between the front right camera 171 and the back right camera 181 is made for selecting a source of visual content to transmit to the remote environment 102. The addition of a correction factor of 0.11 is an example of a relatively simple adjustment, and the implementation of the correction factors having higher degrees of complexity are contemplated by this disclosure. In one example, use of weighted coefficients based on historical or current data collection results, which are stored in memory, could be used to make adjustments to the correction factor.

Furthermore, as illustrated by the discussion above, the processing of the content data can be distributed between three different levels including (1) the peripheral device level, (2) the cluster level, and (3) the content hub level. A device at each level can determine whether or not to transmit the content data from a particular peripheral device. For example, at the first level a given peripheral device may determine whether or not to transmit the content data captured by that given peripheral device. Continuing the example, at the second level, if the master of a cluster receives content data from the given peripheral device, then the master of the cluster may determine whether or not to transmit the content data captured by the given peripheral device to the conference hub 110. Further continuing the example, at the third level, if the conference hub 110 receives content data from the given peripheral device, then the conference hub 110 may determine whether or not to transmit the content data captured by the given peripheral device to the remote environment 102.

In some embodiments, more than one source of content data (e.g., visual data) may be transferred to the remote environment 102. For example, the display device (not shown) located in the remote environment 102 may be configured to display two or more views from the local environment 101, such as a main display and an auxiliary display. In one embodiment, the main display can be the source of visual data from the local environment 101 with the highest data confidence level, such as visual data from a camera recording the current speaker in the local environment 101 or visual data from the portable electronic device 174 in the local environment 101 showing a slide of an active presentation. The auxiliary display can be the source of visual data from the local environment 101 with the second highest data confidence level or visual data that is frequently used during video conferences in the local environment 101. In some cases, the auxiliary display can be the source of visual data from the local environment 101 with a data confidence level that is less than a highest data confidence level, or even second highest data confidence level, assigned to another peripheral device (e.g., main display) in a cluster of peripheral devices. For example, if the whiteboard 192 is frequently used during video conferences in the local environment 101, but the whiteboard 192 is currently inactive, then the auxiliary display in the remote environment 102 may show a grayed out or a low-resolution version of the auxiliary display until the whiteboard 192 becomes active.

In other embodiments, auxiliary content data can also be transmitted to the remote environment 102 without being provided to the users at the remote environment. For example, in one embodiment, the conference hub 110 may transmit an auxiliary source of audio content and visual content to the remote environment. These auxiliary sources of content can then immediately be used by the remote environment 102 if a problem occurs with the audio and visual content data that was being provided to users at the remote environment 102 from other audio and visual sources. In some embodiments, the auxiliary sources of content data include the devices having the second highest data confidence levels for that type of content data (e.g., audio or visual data).

The conference hub 110 includes a processor 110A, a memory unit 110B, and I/O hardware 110C. Although shown as one device, in some embodiments the functions described herein as being performed by the conference hub 110 can be performed by two or more devices (not shown).

The processor 110A may include a central processing unit (CPU), a digital signal processor (DSP), and/or application-specific integrated circuits (ASIC), and other useful components. The processor 110A may be used to execute software programs stored in the memory unit 110B in order to perform various functionalities associated with the video conferencing system 100, such as determining what audio and visual content data to transmit from the local environment 101 to the remote environment 102. The memory unit 110B may be any technically feasible type of hardware unit configured to store data. For example, memory unit 110B can include some form of one or more of non-volatile memory, such as a hard disk, a random access memory (RAM) module, a flash memory unit, or a combination of different hardware units configured to store data. Memory unit 110B can include memory for storing data received from various peripheral devices, such as the metadata or other data described above. Memory unit 110B can further include sufficient memory to serve as a buffer for temporarily storing content data from the various peripheral devices, so that the conference hub 110 can seamlessly switch between different sources of audio and/or visual sources of content. Memory unit 110B may include one or more software applications. The memory unit 110B may also include stored media data that is used by the processor 110A to perform various parts of the methods described herein. The software application, which is stored within the memory unit 110B, includes program code that may be executed by processor 110A in order to perform various functionalities associated with the conference hub 110 and methods described herein. The stored media data may include information that is delivered to and/or received from a peripheral device or another electronic device. The stored media data may reflect various data files, settings and/or parameters associated with the local environment, peripheral devices and/or desired behavior of the conference hub 110.

The I/O hardware 110C can include one or more components for enabling the conference hub 110 to communicate with the peripheral devices in the local environment 101 as well as with the devices located in the remote environment 102 and the Internet environment 103. For example, the I/O hardware 110C can include one or more of a USB controller, HDMI controller, and network interface controllers for communicating with one or more of the peripheral devices and devices located in the remote environment 102 and the Internet environment 103.

Selecting Content

Figure 1C:
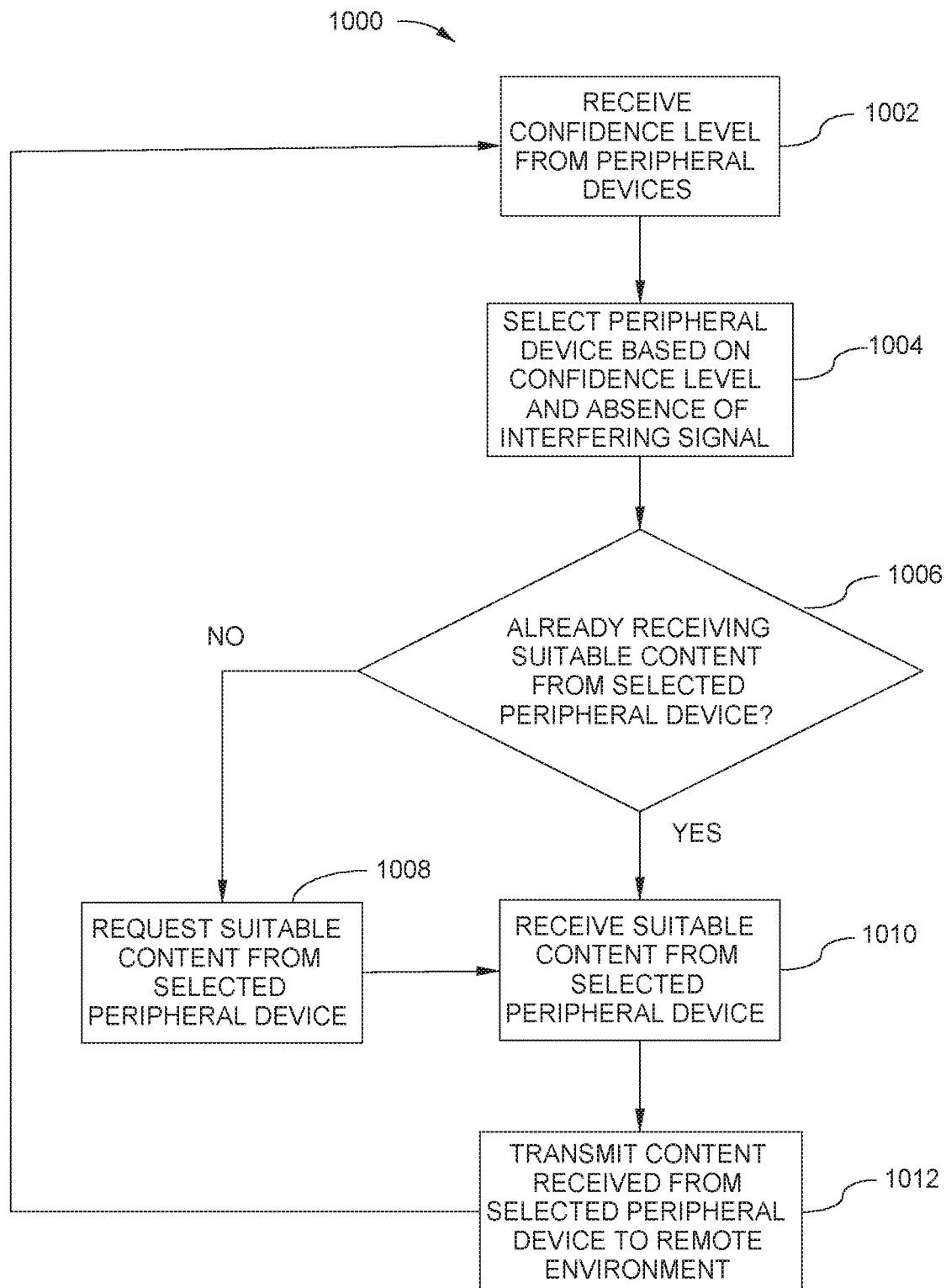
FIG. 1C is a process flow diagram of a method for selecting a source for a first type of content in the local environment and transmitting content from the selected source to the remote environment, according to one embodiment.

FIG. 1C is a process flow diagram of a method 1000 for selecting a source (i.e., a peripheral device) for a first type of content (e.g., audio or visual data) in the local environment 101 and transmitting content from the selected source to the remote environment 102, according to one embodiment. The method 1000 generally includes the use of the conference hub 110 to facilitate the performance the method steps disclosed herein. Although the method 1000 is described in reference to selecting the overview microphone 163 to provide audio content to the remote environment 102, the method 1000 also applies to selecting other audio peripheral devices to provide audio content data or for selecting other peripheral devices to provide visual content data. In some embodiments, the blocks found in the method 1000 can be repeated multiple times in an automated fashion by use of algorithms running on the various devices.

At block 1002, the conference hub 110 receives metadata comprising a data confidence level from at least two peripheral devices that can provide the first type of content data (e.g., audio). For example, the conference hub 110 can receive metadata including data confidence levels from each peripheral device in each cluster 141-144 capable of providing the first type of content data (e.g., audio data) as shown in FIGS. 1A, 1B.

At block 1004, the conference hub 110 determines and selects the peripheral device (e.g., overview microphone 163) having the highest data confidence level. In some configurations, the selected peripheral device is one that is receiving data that does not include an interfering signal, such as unwanted audio for audio content or undesired visual elements for visual content as described in further detail below. In embodiments in which an interfering signal is factored into determining the data confidence levels received from the peripheral devices, the conference hub 110 can make the determination at block 1004 based on the received data confidence levels.

At block 1006, the conference hub 110 determines whether the conference hub 110 is already receiving suitable content from the peripheral device selected at block 1004. For example, if the conference hub 110 selects the overview microphone 163 as the audio peripheral device to provide audio content to the remote environment 102 at block 1004, but the overview microphone 163 is providing audio content to the conference hub 110 at a low resolution, then the conference hub 110 may determine that high resolution audio content from the overview microphone 163 would be more suitable to send to the remote environment 102.

At block 1008, upon determining the conference hub 110 is not receiving suitable content from the peripheral device selected at block 1004, the conference hub 110 can send a request to the peripheral device selected at block 1004 (e.g., overview microphone 163) to start sending suitable content (e.g., high resolution audio content) to the conference hub 110 that can then be transmitted to the remote environment 102. If, at block 1006, the conference hub 110 is already receiving suitable content from the peripheral device selected at block 1004 (e.g., overview microphone 163), then block 1008 can be skipped.

At block 1010, the conference hub 110 receives suitable content data from the peripheral device selected at block 1004. In some embodiments, the conference hub 110 may store the received content data in memory and/or alter the received content data before proceeding on to block 1012.

At block 1012, the conference hub 110 initiates a transmission of the content received from the peripheral device selected at block 1004 (e.g., high resolution audio content from the overview microphone 163) to the remote environment 102.

Figure 1D:
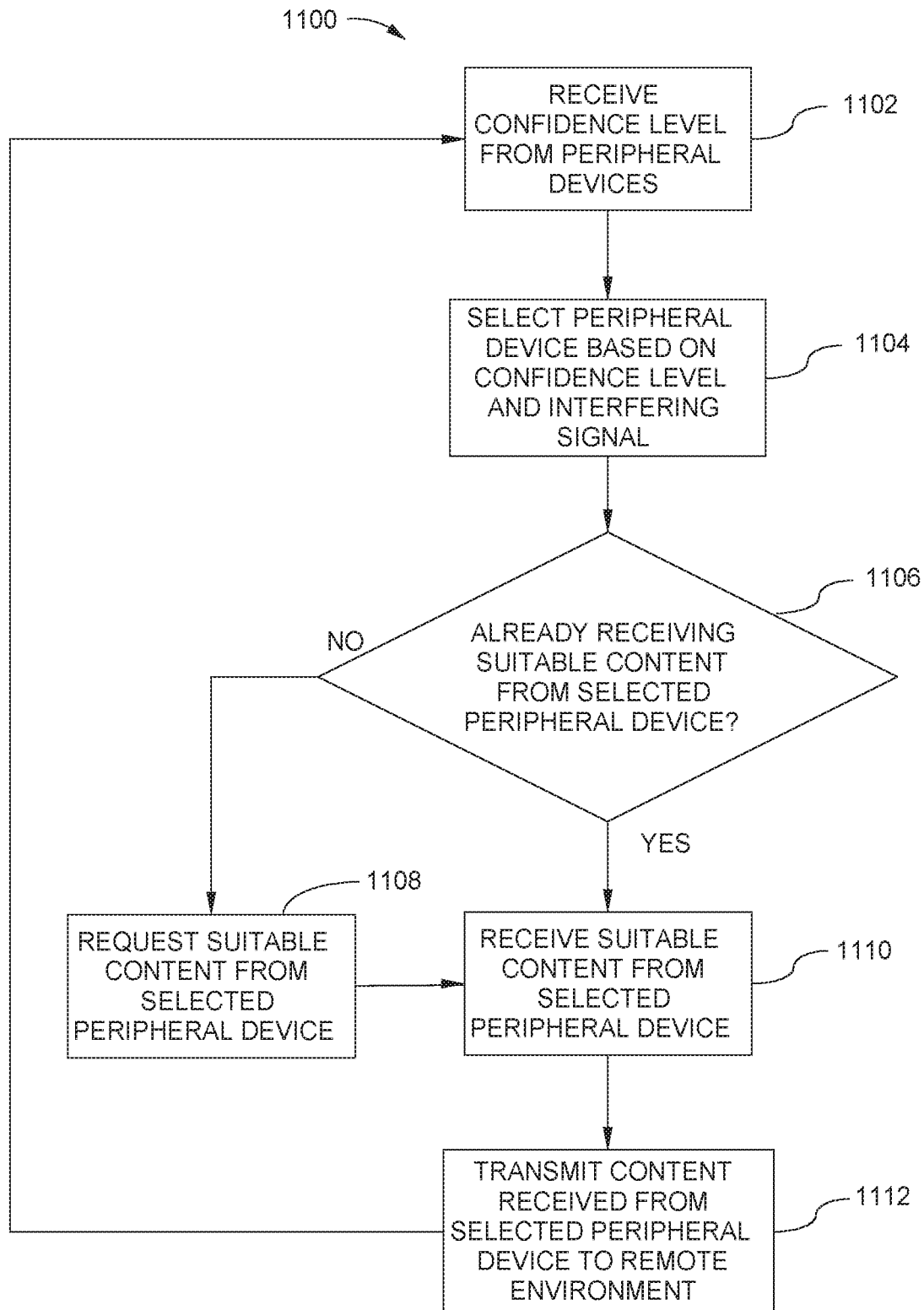
FIG. 1D is a process flow diagram of a method for selecting a source for a first type of content in the local environment and initiating the transmission of content from the selected source to the remote environment, according to one embodiment.

FIG. 1D is a process flow diagram of a method 1100 for selecting a source (i.e., another peripheral device) for a first type of content (e.g., audio or visual data) in the local environment 101 and initiating the transmission of content from the selected source to the remote environment 102, according to one embodiment. The method 1100 includes the use of a peripheral device to facilitate the performance of the method steps disclosed herein. Although the method 1100 is described in the following description in reference to the overview microphone 163 selecting the PTZ camera 162 to provide visual content data to the remote environment 102, the method 1100 also applies to selecting other visual peripheral devices to provide visual content data or for any peripheral device to select any other peripheral device to provide content data (e.g., audio, video, other visual content) to the remote environment 102. Furthermore, although method 1100 is described in reference to FIGS. 1A and 1B, the following description of the method 1100 is also applicable to an embodiment in which there is no conference hub 110 and/or clusters 142-144, such that, for example, the cluster 141 communicates directly with the router 120 to communicate with the remote environment 102. In some embodiments, the blocks found in the method 1100 can be repeated multiple times in an automated fashion by use of algorithms running on the various devices.

In the following description of FIG. 1D, the overview microphone 163 is the master of the cluster 141 and is the device that communicates to the other peripheral devices in the cluster 141 and is also the device that communicates with the remote environment 102 through the router 120. At block 1102, the overview microphone 163 receives metadata comprising a data confidence level from at least two peripheral devices that can provide the first type of content data (e.g., visual data content). For example, the overview microphone 163 can receive metadata including data confidence levels from each peripheral device in cluster 141 capable of providing the first type of content data (e.g., visual data content), such as the overview camera 161 and the PTZ camera 162.

At block 1104, the overview microphone 163 determines and selects the peripheral device (e.g., PTZ camera 162) having the highest data confidence level. In some configurations, the selected peripheral device is also one that is receiving data that does not include an interfering signal, such as unwanted audio for audio content or undesired visual elements for visual content as described in further detail below. In embodiments in which an interfering signal is factored into determining the data confidence levels received from the peripheral devices, the overview microphone 163 can make the determination at block 1104 based on the received data confidence levels.

At block 1106, the overview microphone 163 determines whether the overview microphone 163 is already receiving suitable content from the peripheral device selected at block 1104. For example, if the overview microphone 163 selects the PTZ camera 162 as the visual peripheral device to provide visual content to the remote environment 102 at block 1104, but the PTZ camera 162 is providing visual content to the overview microphone 163 at a low resolution, then the overview microphone 163 may determine that high resolution visual content from the PTZ camera 162 would be more suitable to send to the remote environment 102.

At block 1108, upon determining the overview microphone 163 is not receiving suitable content from the peripheral device selected at block 1104, the overview microphone 163 can send a request to the peripheral device selected at block 1004 (i.e., PTZ camera 162) to start sending suitable content (e.g., high resolution visual content data) to the overview microphone 163 that can then be transmitted to the remote environment 102. If, at block 1106, the overview microphone 163 is already receiving suitable content from the peripheral device selected at block 1104 (e.g., PTZ camera 162), then block 1108 can be skipped.

At block 1110, the overview microphone 163 receives suitable content from the peripheral device selected at block 1104 (i.e., PTZ camera 162). In some embodiments, the conference hub 110 may store the received content data in memory and/or alter the received content data before proceeding on to block 1112.

At block 1112, the overview microphone 163 initiates a transmission of the content received from the peripheral device selected at block 1104 (e.g., high resolution audio content from the PTZ camera) to the remote environment 102.

Figure 1E:
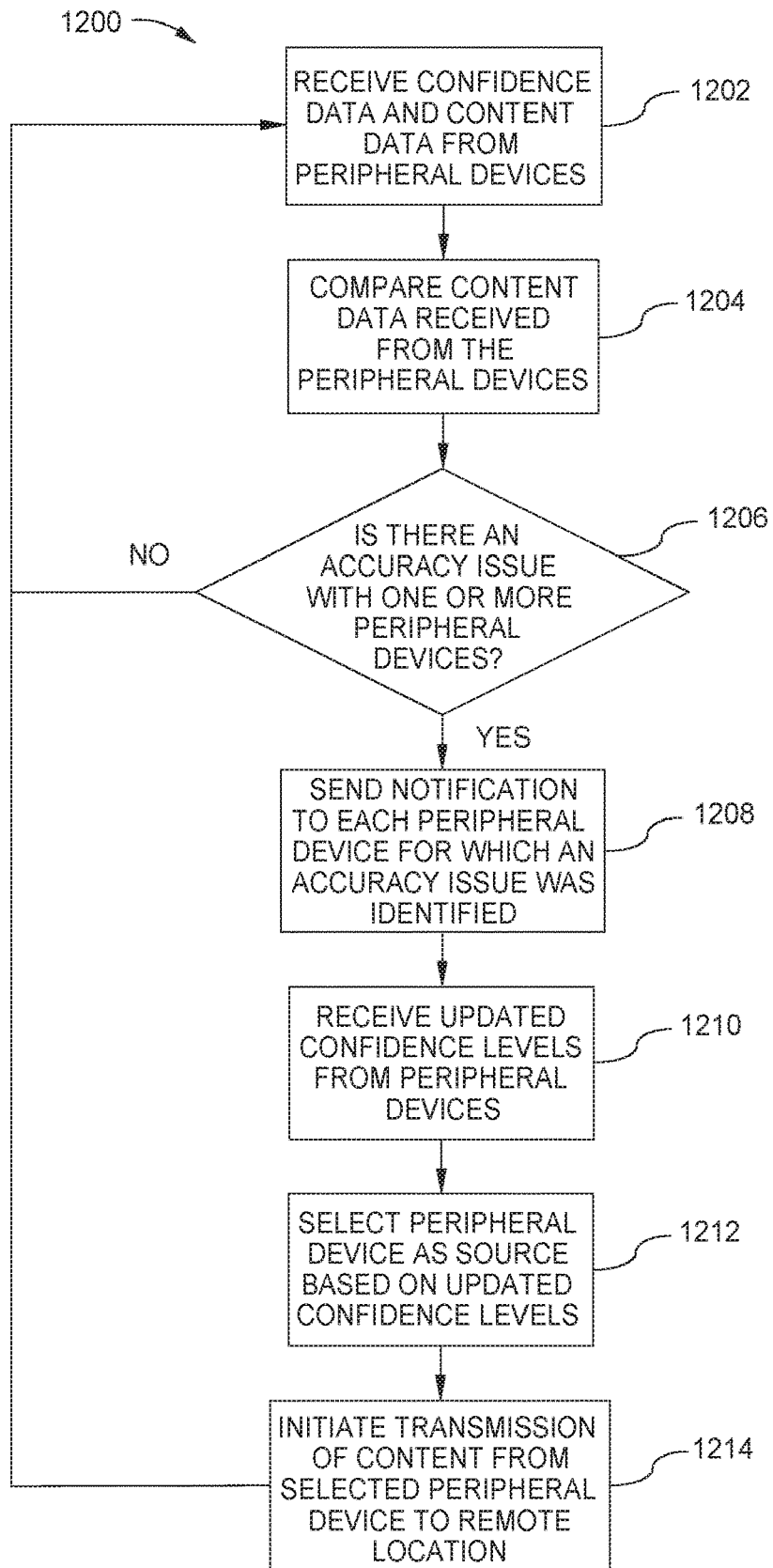
FIG. 1E is a process flow diagram of a method for improving the process for identifying the most appropriate source of content to send to a remote environment, according to one embodiment.

FIG. 1E is a process flow diagram of a method 1200 for improving the process for identifying the most appropriate source of content (e.g., audio content, video content, or other visual content) to send to the remote environment 102, according to one embodiment. The process for identifying the most appropriate source of content can be improved by improving the accuracy of the data confidence levels received from the peripheral devices. A variety of techniques can be used to improve the accuracy of the data confidence levels received. As discussed above, a correction factor can be used to adjust the data confidence level of a given peripheral device up or down, for example by 0.1, so that the data confidence level from the given peripheral device enables a more accurate comparison to be made with the data confidence levels received from other peripheral devices. In the method 1200, techniques other than the correction factor can be used to improve the accuracy of the data confidence level received from the peripheral devices, and are described below. In some embodiments, the blocks found in the method 1200 can be repeated multiple times in an automated fashion by use of algorithms running on the various devices.

At block 1202, a controlling device as defined above (e.g., the conference hub 110 or a peripheral device performing tasks commonly performed by the conference hub) receives data confidence level and content data for a first type of content (e.g., audio) from a first peripheral device and a second peripheral device. The method 1200 also applies when the controlling device receives content from more than two peripheral devices, but the following is described for only two peripheral devices to reduce the complexity of the following description.

At block 1204, the controlling device compares the content received from the first and second peripheral devices. For example, if the content received from the first and second peripheral devices is audio content, then the controlling device can compare properties of the audio content, such as decibel levels, levels of background noise or other interfering signals or signal-to-noise ratios. On the other hand, if the content received from the first and second peripheral devices is visual data content, then the controlling device can compare properties of the visual data content, such as levels of distracting movements, white balance issues, reflections, glare, obstruction(s) in a view (e.g., view of current speaker is obstructed by standing person or an object).

At block 1206, the controlling device determines there is an accuracy issue with one or more of the first peripheral device and the second peripheral device based on analyzing the data confidence levels received from the peripheral devices and the comparison of the content data performed at block 1204. For example, in one embodiment, the controlling device determines the audio content received from the first peripheral device is more appropriate (e.g., higher decibel level of current speaker with less background noise) to send to the remote environment 102 than the audio content received from the second peripheral device, but that the data confidence level received from the first peripheral device is lower than the data confidence level received from the second peripheral device. Based on this information, the controlling device may determine there is an issue with the confidence received from the first peripheral device, the second peripheral device, or both peripheral devices. For example, the controlling device may determine based on the analysis of the content from each peripheral device that the data confidence level from the first peripheral device should be in a first range (e.g., 0.8 to 0.9) while the data confidence level from the second peripheral device should be in a second range (e.g., 0.7 to 0.8). Continuing the example, the controlling device can determine there is an issue with each peripheral device that sent a data confidence level falling outside of the data confidence level range determined by the controlling device. If an accuracy issue is not identified at block 1206, then the method can begin again at block 1202.

At block 1208, the controlling device sends a notification signal to each peripheral device for which the controlling device identified an accuracy issue for at block 1206 to notify that peripheral device that there is an accuracy issue regarding the data confidence level for that peripheral device. In some embodiments, the notification signal can include instructions for specific adjustments that the peripheral device should take to improve the accuracy of the data confidence level determined by the peripheral device. In some embodiments, each peripheral device can include multiple algorithms stored in memory for determining a more accurate data confidence level for that peripheral device.

In one embodiment, the notification signal includes instructions for the peripheral device having the accuracy issue to use a different algorithm. For example, in one such embodiment, the controlling device may send a notification signal to a visual data generating peripheral device to use an algorithm that factors in white balance if the controlling device determines that white balance is a possible cause for an inaccurate data confidence level received from a particular peripheral device and that that particular peripheral device was not currently accounting for white balance when determining the data confidence level.

In another embodiment, the notification signal includes instructions for the peripheral device having the accuracy issue to adjust the algorithm the algorithm the peripheral device is currently using to improve the accuracy of the data confidence level determined by the peripheral device. For example, in one embodiment, the notification signal can include instructions to adjust the weight applied to a particular factor for determining the data confidence level of the peripheral device. For example, an audio peripheral device may determine a data confidence level by analyzing only two factors including the decibel level and interfering signals. In one such embodiment, the audio peripheral device may apply a weighting factor of 0.8 to the decibel level and a weighting factor of 0.2 to the interfering signal. In this embodiment, the controlling device may determine that there is an accuracy issue caused by having a weighting factor for the interfering signal that is too low, and the controlling device may send a notification signal to the audio peripheral device to increase the weighting factor for the interfering from 0.2 to 0.4 and to decrease the weighting factor for the decibel level from 0.8 to 0.6.

In another embodiment, upon determining there is an accuracy issue with one or more of the peripheral devices, the controlling device can send a notification signal to two or more of the peripheral devices to perform a recalibration process. In one such embodiment, the notification signal includes instructions for the two or more peripheral devices to each use a same algorithm for determining data confidence levels to reduce the differences in how the peripheral devices are determining the data confidence levels. In another embodiment, the notification signal from the controlling device may be a signal to one or more of the peripheral devices to perform a recalibration process, and the peripheral device receiving that notification signal can then contact on or more other peripheral devices to initiate the recalibration process. This recalibration process may include the peripheral devices using a same algorithm to determine the data confidence level to reduce any error caused by differences in the algorithm.

At block 1210, the controlling device receives updated data confidence levels from the first peripheral device and the second peripheral device. At block 1212, the controlling device can select a peripheral device, such as the first peripheral device or the second peripheral device, as an appropriate source of content to send to the remote environment 102 based on the updated data confidence levels. At block 1214, the controlling device can initiate a transmission of content data from the selected peripheral device to the remote video conferencing location 102. The controlling device can periodically rerun method 1200 to improve the accuracy of the data confidence levels received from the peripheral devices.

Mapping and Unwanted Audio

Mapping of the local environment 101 can help obtain improved content data (e.g., audio and visual data) during a video conference in the local environment 101 by knowing the physical relationship between devices within a local environment 101. Mapping of the local environment 101 can include identifying the locations of the peripheral devices relative to each other. In some embodiments, the mapping includes obtaining the actual dimensions of the room in which the peripheral devices of the local environment 101 are located and identifying where peripheral devices are located relative to a common reference point within the local environment 101. This common reference point can be an object having a fixed location, such as a light switch, a decoration, a light fixture, etc. within the local environment 101. In some embodiments, a centrally located object with a fixed position, such as an object above the conference table 137, or a window frame, or corner of a room can be used, so that the reference object is in the field of view of many or each camera in the local environment 101. In some embodiments, a centrally located object is moveable but has a fixed position at the start of the meeting, such as an object that is positioned at a desired position on the conference table 137. In other embodiments, a movable object can be used a reference point. For example, a large standing light can be used as a reference object. Even if the light is moved, peripheral devices, such as cameras, can track the movement of the object easily due in part to its large size and/or ability to be seen from all angles in the local environment. In still other embodiments, multiple objects (e.g., microphones, conference room phones, etc.) can be used as reference objects for mapping a video conference environment, such as the local environment 101. For example, peripheral devices, such as cameras, can then track the movement of these multiple objects in the local environment 101 and map the location of the peripheral devices relative to these reference objects to assist in determining the most appropriate sources of audio and visual content.

In some embodiments, these objects described above, which can be used as initial reference point(s), can be identified at any given time by the other peripheral devices based on an electromagnetic signal (e.g., wireless signal, emitted light, etc.) and/or audible signal generated by the centrally located object or detected by some other physical attribute of the reference object that is in the field of view of each camera in the local environment 101. In some embodiments, the cameras in the local environment may also use one or more of these electromagnetic signals (e.g., light flashes) or audible signals (e.g., audible tones) to aid in identifying the position of the reference object. In some embodiments, the cameras in a cluster or in the local environment may also use one or more synchronized electromagnetic or audible signals to aid in identifying the position of the reference object to other peripheral devices in the cluster or in the local environment.

In some embodiments, each camera in the local environment 101 with PTZ functionality can pan, tilt, and zoom in on each microphone in the camera's field of view, so that each PTZ camera can store the PTZ positional information (also referred to as settings) that allows the camera to focus on each microphone, which assists in focusing on objects or people positioned proximate to each microphone.

Each PTZ camera can also store settings to assist the camera in focusing on one or more areas around each microphone in the local environment 101. For example, in one embodiment the area surrounding a microphone can be classified into quadrants. For instance, referring to FIG. 1B, the overview microphone 163 could be surrounded by the following four quadrants going in a clockwise direction: a back right quadrant (12 o'clock to 3 o'clock); a back left quadrant (3 o'clock to 6 o'clock); a front left quadrant (6 o'clock to 9 o'clock); and a front right quadrant (9 o'clock to 12 o'clock). Each PTZ camera could then adjust and store the settings to focus on the different quadrants surrounding each microphone. The conference hub 110 can then analyze the visual data received from each PTZ camera for each quadrant around each microphone and rank the PTZ cameras to determine which PTZ cameras obtain better views of these quadrants than the other cameras.

In one embodiment, the conference hub 110 performs the ranking in an empty conference room and visual recognition software can be used to determine which camera has the best view of that quadrant. In one example, the visual recognition software can determine which camera has the largest view of the edge(s) of the conference table 137 in that quadrant. In another embodiment, the conference hub 110 performs a ranking, or data collection preference ranking, with people seated at each seat in the conference table. The conference hub 110 can then use visual recognition software to determine how many faces can be clearly viewed when each PTZ camera focuses on a given quadrant for a particular microphone. In another embodiment, the ranking of PTZ cameras for each quadrant can be adjustable by an operator. For example, an operator may adjust a data collection preference ranking for the front right quadrant of the overview microphone 163 to be front right camera 171 ranked first, the whiteboard camera 191 ranked second, and the PTZ camera 162 ranked third. The data collection preference ranking automatically generated by the conference hub 110 may generate the same results. A data collection preference ranking entered by the operator or automatically generated can then be used as long as the microphone does not move, which can trigger the ranking process to be run again.

During a videoconference, the conference hub 110 can determine a particular microphone (e.g., the overview microphone 163) is the most appropriate audio source for a first audio signal occurring in the local environment 101 during a first time period. The microphone (e.g., the overview microphone 163) can identify which quadrant a source of audio is coming from by using time of arrival techniques described below. The conference hub 110 can then use the data collection preference rankings for the identified quadrant for that microphone to evaluate and/or select the most appropriate visual data source (e.g., front right camera 171).

This pan, tilt, and zoom calibration process can be rerun by the PTZ cameras to account for movement of any of the microphones. The PTZ cameras can be configured to run the PTZ calibration process before a video conference begins or at fixed intervals, such as once a day. Furthermore, each PTZ camera can be configured to run the PTZ calibration process when a signal is received by the PTZ camera that one or more of the microphones have moved. Each portable or semi-portable microphone in the local environment 101 can include one or more sensors (e.g., an accelerometer) to detect movement of the microphone, and thus determine that the microphone's position has changed from one instant in time to a second instant in time. Other portable or semi-portable devices (e.g., portable electronic device 174) in the local environment 101 can also include these features to detect movement. Movement detected by these one or more sensors can trigger a signal to be sent from the microphone to the PTZ cameras that includes data identifying that the microphone was moved, so that these PTZ cameras can rerun the PTZ calibration process. The PTZ positional information stored in the memory of the PTZ cameras can then be used with audio information during a video conference to pan, tilt, and zoom a PTZ camera to more accurate locations during the video conference, for example to show the current speaker. The PTZ positional information can also be transferred to and stored within the memory of the conference hub 110 so that the positional information of a peripheral device (e.g., front microphone 173), which is known relative to an external reference (i.e., relative to the centrally located object), can then be transferred by the conference hub 110 to and used by the peripheral device (e.g., front microphone 173) to help perform some activity, such as to assist in deciding a data confidence level of the information (e.g., audio content) that the peripheral device (e.g., front microphone 173) is receiving.

Because the local environment 101 includes multiple microphones, information from these microphones can be used to identify where an audio source is located in the local environment 101, such as the location of the current speaker. For example, time delay of arrival techniques can be used to estimate the direction of an audio source relative to the position of the microphones in the local environment 101. In some embodiments to reduce the complexity of determining the location of an audio source, it can be useful to use a single electronic device with multiple microphones instead of using separate microphones installed at a variety of locations within the local environment 101.

Figure 2A:
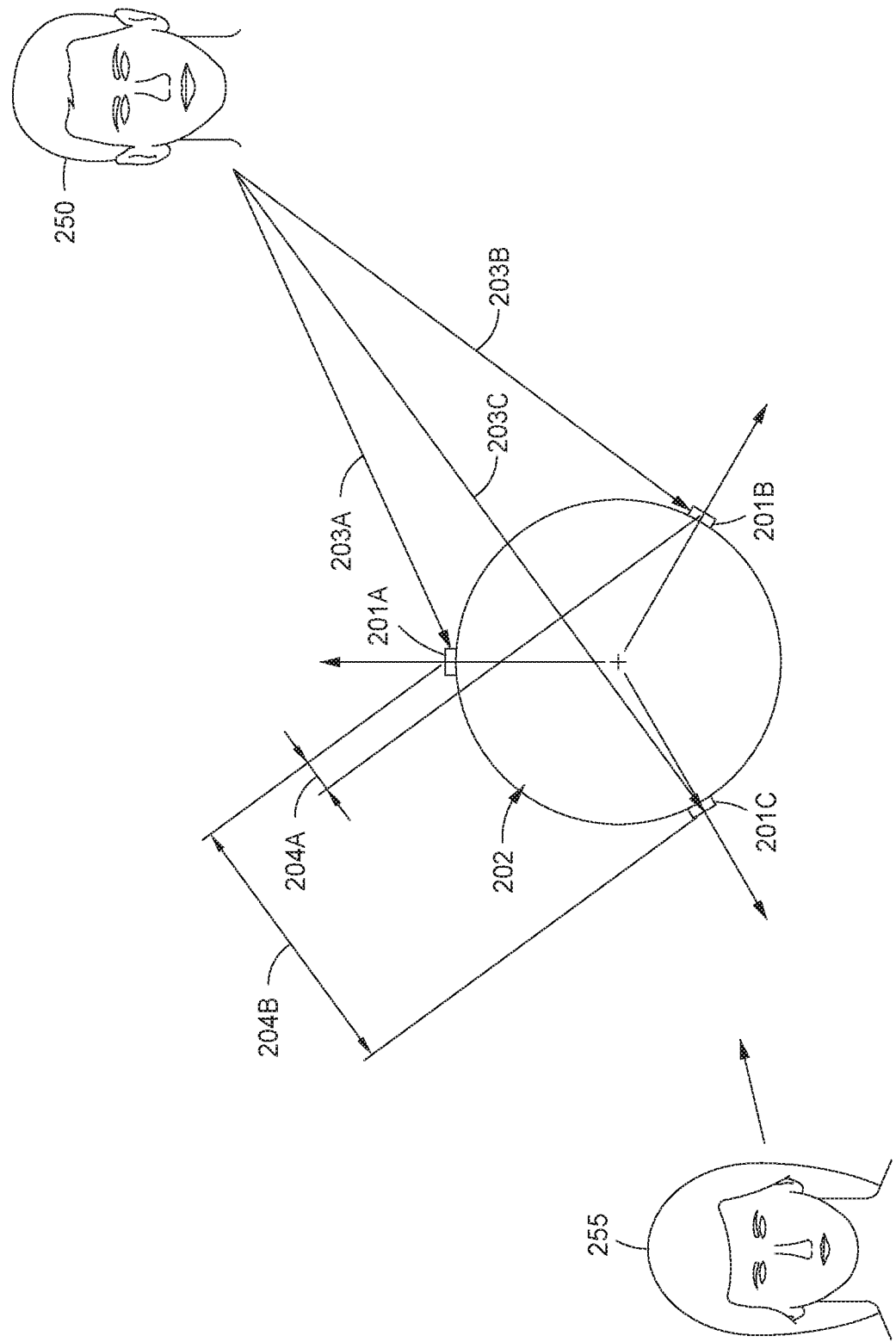
FIG. 2A illustrates an example of an audible signal processing device interacting with an audible source and a source of unwanted audio, according to one embodiment.

FIG. 2A illustrates an example of an audio signal processing device 202 interacting with an audio source 250 and a source of unwanted audio 255, according to one embodiment. In some embodiments, the audio signal processing device 202 may take the place of one of the microphones in the local environment 101 described above. In some embodiments, the audio signal processing device 202 can be installed at a fixed position in the local environment 101. For example, in one embodiment, the audio signal processing device 202 is placed in a fixed position on the conference table 137.

The audio signal processing device 202 includes three microphones 201A, 201B, and 201C, which can be used to detect the direction of one or more audio sources relative to the audio signal processing device 202, such as the audio source 250 (e.g., the voice of the current speaker) and the unwanted audio 255 (e.g., a rattling bag of potato chips, a ringing cell phone, etc.). In FIG. 2A, the audio source 250 is positioned a first distance 203A from a first microphone 201A, a second distance 203B from a second microphone 201B and a third distance 203C from a third microphone 201C. Based on a far-field sound wave propagation assumption the time delay seen by the second microphone 201B and the third microphone 201C relative to the first microphone 201A, which is closest to the audio source 250, will be proportional to the distance 204A between the first microphone 201A and the second microphone 201B in the direction of the received audible signal from the audio source 250 and the distance 204B between the first microphone 201A and the third microphone 201C in the direction of the received audible signal from the audio source 250, respectively.

Figure 2B:
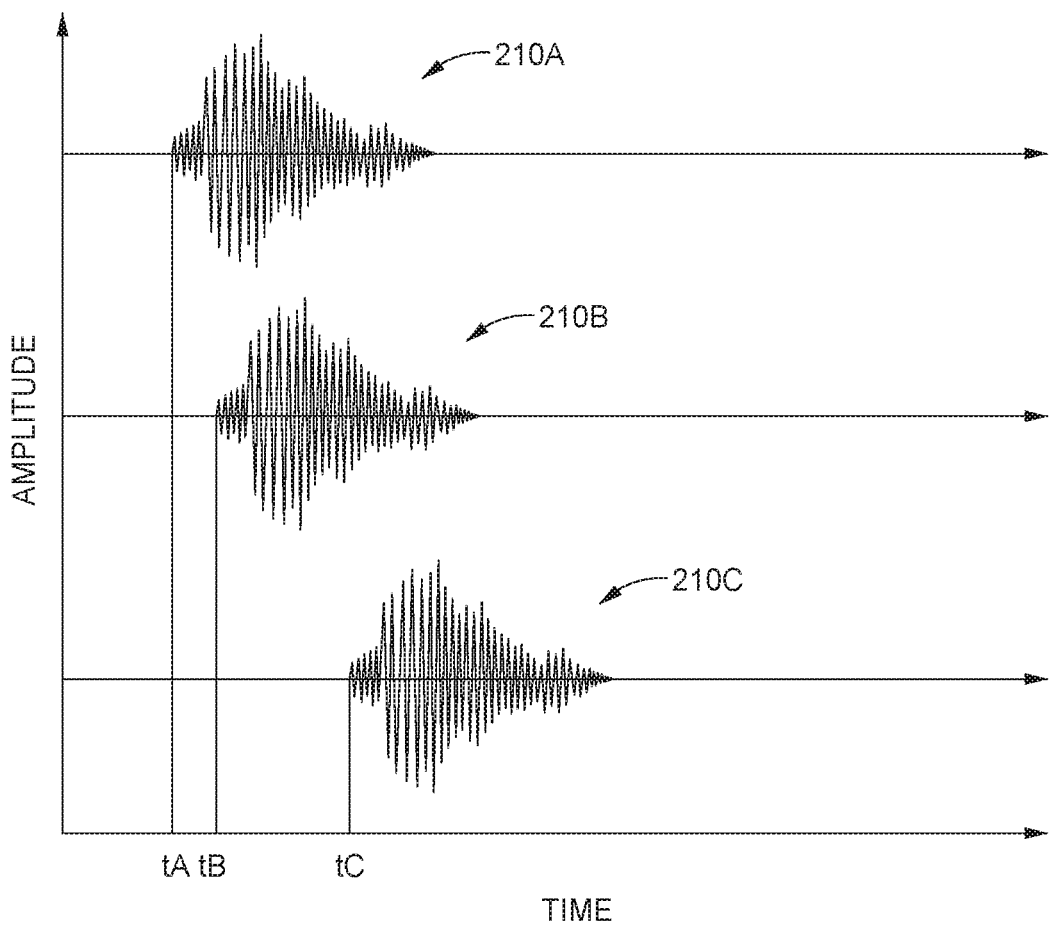
FIG. 2B illustrates the delays that will be seen by the microphones of FIG. 2A when these microphones detect the same audible signals that are generated by the audible source of FIG. 2A, according to one embodiment.

FIG. 2B illustrates the delays that will be seen by the microphones 201A-201C when these microphones detect the same audible signals 210A-210C, respectively, that are generated by the audio source 250, according to one embodiment. However, the audible signals that are received by the microphones 201A-201C will also receive audible signals from other sources, such as the unwanted audio 255 at various different times due to each microphone's relative position to the other sources. The signals from the unwanted audio 255 can prevent or obscure the audio signal processing device 202 from detecting the desired information found with the audible signal received from the audio source 250. The audio signal processing device 202 can use the signals received by the different microphones to identify signals coming from a common source (e.g., the audio source 250 or the unwanted audio 255) and then preferentially exclude one or more of the signals (e.g., the signal from the unwanted audio 255) so that the desired audio source (i.e., the audio source 250) can be heard more clearly. The unwanted audio can be identified by analyzing properties of an audio signal, such as the frequency (e.g., a ringing cell phone often has frequencies not used in speech) or in one embodiment, any audio that is identified as not being speech can be classified as unwanted audio.

One will note that the delay one microphone will experience versus another microphone is proportional to the differences in distance of each microphone from the audio source and is related to the speed of sound (e.g., 340.3 m/s at sea level). As illustrated in FIG. 2B, the audible signal 210A is received by the first microphone 201A at time $t_A$, and thus the delay that the second microphone 201B has when it receives the audible signal 210B from the time when the first microphone 201A receives the audible signal 210A is equal to $t_B-t_A$. The delay that the third microphone 201C has relative to the first microphone 201A is due to the time when it receives the audible signal 210C versus when the first microphone 201A receives the audible signal 210A is equal to $t_C-t_A$. Thus, the time delay that each microphone may see relative to the other microphones within the geometrical array of microphones will depend on the relative orientation and position of the audible source to each of the microphones and their relative distance apart from each other. During the processing of the received audible signals by the audio signal processing device 202, some additional signal processing related temporal delays, such as sampling rate delays, may be generated.

In embodiments in which the audio signal processing device 202 is included in the local environment 101, the PTZ calibration process described above can be modified to be performed using the audio signal processing device 202 instead of the other microphones in the local environment 101 or in addition to the other microphones in the local environment 101. Furthermore, in some of these embodiments, the audio signal processing device 202 can be used as the reference point that is in the field of view of all of the PTZ cameras.

As mentioned above, the audio signal processing device 202 can simplify the process of determining the direction of various audio sources relative to the audio signal processing device 202, such as the direction of the audio source 250 and the unwanted audio 255 relative to audio signal processing device 202. Thus, because the audio signal processing device 202 can identify the direction of audio sources relative to the audio signal processing device 202 and the PTZ cameras in the local environment 101 can be calibrated to alter their field of view by performing a pan, tilt, and/or zoom based off of a known or a determined position of the audio signal processing device 202, then the PTZ cameras can use the directional information for audio sources from the audio signal processing device 202 to make adjustments to focus on desired audio sources (e.g., audio source 250) and in some embodiments, pan, tilt, and/or zoom away from undesired audio sources, such as unwanted audio 255. Furthermore, in some cases the PTZ positional information created for the position of the audio signal processing device 202 can be used in conjunction with audible source directional information determined by the audio signal processing device 202, based on the orientation and position of the audio signal processing device 202 relative to the centrally located object, to determine which of the generated content data by all of the peripheral devices is the most appropriate content data to be provided to the devices located in the remote environment 102 and the Internet environment 103.

In addition to assisting individual PTZ cameras make adjustments to focus on particular audio signals in the local environment 101, data from the audio signal processing device 202 can also be used to switch the audio or visual data source the conference hub 110 is using to send to the remote environment 102. For example, if the audio signal processing device 202 detects that the unwanted audio 255 is coming from a direction of the front of the conference table 137, then this information can be transferred to the conference hub 110, and may be used to switch the audio source from the front microphone 173 to the overview microphone 163. The switch from the front microphone 173 to the overview microphone 163 can be made despite the front microphone 173 having a higher data confidence level than the overview microphone 163. Although in this example, the unwanted audio 255 is described as coming from a general area (front of the conference table 137), the audio signal processing device 202 may provide a much more precise indicator to the conference hub 110 for where the unwanted audio is coming from, such as 87.3 degrees relative to the orientation and position of the centrally located object, which in some embodiments can be the audio signal processing device 202.

Unwanted audio often is related to distracting movements that could reduce attention to the current speaker during a video conference. A device may determine the data that it is receiving is unwanted audio by use of an algorithm that analyzes one or more characteristics of the received data, such as the duration the data is received over (e.g., sound or movement having a short time duration, constant sound level), amplitude of the received sound, repetitiveness of the received sounds or movements, or other useful noise detection metric. Therefore, under the same circumstances (i.e., unwanted audio coming from the front of the conference table 137), the conference hub 110 can use the information from the audio signal processing device 202 to either switch to a different camera or have the currently selected camera pan, tilt, or zoom to remove the area related to the unwanted audio 255 from the visual data sent to the remote environment. For example, in response to the unwanted audio 255, the conference hub may determine that it is preferable to switch from the front left camera 172 to the back left camera 182 or to pan the front left camera 172 away from the area related to the unwanted audio 255. Thus, the conference hub 110 can help reduce the negative impact that interfering signals, such as unwanted audio and distracting movement can have on a videoconference. There can be other undesirable visual elements besides distracting movement, such as white balance issues, other image color issues, reflections, glare, obstructed views (e.g., view of current speaker is obstructed by standing person or an object), or predefined areas of a room or parts of a scene that is desired to be blocked (e.g., as window or door opening).

Beamforming can also be used by the audio signal processing device 202 or other audio receiving devices (e.g., microphones 163, 173, 183, 193) to reduce the effect unwanted audio can have on desired audio. Beamforming can use multiple microphones to enhance desired audio with constructive interference and reduce unwanted audio with destructive interference. Use of multiple microphones allows spatial differences between the desired audio and the unwanted audio to be determined, for example by using differences in time of arrival of the audio signals at the different microphones as described above in reference to FIG. 2B. In some embodiments, the beamforming can be accomplished by using the signals from different microphones throughout the local environment 101, such as the overview microphone 163, the front microphone 173, and the back microphone 183. In other embodiments, the audio signal processing device 202 may be used to assist in identifying the direction from which the unwanted audio is coming from and properties of the unwanted audio (e.g., frequency), and then the signals from the other microphones, such as the overview microphone 163, the front microphone 173, and the back microphone 183 can be combined to enhance the desired audio and reduce the unwanted audio.

Time of arrival techniques, such as beamforming, can also be used to identify changes in desired audio. For example, these techniques can be used to identify when the direction of a speaker's voice changes (e.g., the head of the current speaker turns to another direction) or the position of the current speaker changes. Data identifying these directional and/or positional changes can be quickly identified by these techniques and this data can be transferred to the conference hub 110. The conference hub 110 can then use this data to determine if another microphone or camera may be a more appropriate audio or visual data source. For example, if the data indicates that the face of the current speaker has turned from the front left camera 172 to the back left camera 182, then the conference hub 110 may send a signal to the back left camera 182 to increase the likelihood that the visual data source be taken from the back left camera 182. For example, if data confidence levels are being used to determine the camera to use as the visual data source, then the conference hub 110 may send a signal to the back left camera to add 0.1 to the data confidence level of the back left camera 182 when a turn of the head by the current speaker towards the back left camera 182 is detected. In other embodiments, the conference hub 110 can increase the data confidence level (e.g., adding the 0.1 to the data confidence level received from the back left camera 182) instead of instructing the peripheral device to add a correction factor, such as 0.1 to the data confidence level of that peripheral device. In another embodiment, the conference hub 110 may cause the time period over which the data confidence level is determined for the cameras to be shortened based on a change in the data received by the conference hub 110. For example, if data confidence levels are generally determined using the last 10 seconds of data, the detection of the turn of the current speakers face towards the back left camera 182 may cause the time period to shorten to 3 seconds.

Information from the cameras can also be leveraged to improve the quality of the audio content sent to the remote environment 102. For example, one or more of the cameras can be used to identify the position of the current speaker relative to the audio signal processing device 202 or other microphones in the local environment. In one embodiment, the visual data from the back right camera 181 may be transmitted to the conference hub 110 and can used to identify that the current speaker is physically close to the overview microphone 163 despite the back microphone 183 having a stronger audio signal. If the back microphone 183 is also detecting a significant amount of unwanted audio, the conference hub 110 can use the information from the back right camera 181 to mute the back microphone 183 and switch the audio source to the overview microphone 163, which should produce a sufficient audio signal since the visual data identified that the current speaker was physically close to the overview microphone 163.

In another embodiment, data from a camera can be used to add a correction factor for the data confidence level of another peripheral device, such as a microphone. For example, when a camera determines a high data confidence level, for example, based on capturing the current speaker's gaze or by determining the direction the current speaker is facing while speaking, such as towards the camera, then the camera can use this information to increase the data confidence level of one or more other peripheral device based on determining the voice of the current speaker should be in a detection region of the one or more other peripheral devices. The detection region can be a region in which a peripheral device can capture useful data, such as audio or visual data that would be appropriate to transmit to the remote environment 102. For example, the whiteboard camera 191 can determine that a current speaker is standing in front of the whiteboard 192 and facing the whiteboard camera while speaking. Based on this information the whiteboard camera 191 can transmit a signal (e.g., a correction factor) to increase the data confidence level of the whiteboard microphone 193 and the overview microphone 163. In one embodiment, the whiteboard camera transmits a signal to increase the data confidence level of the whiteboard microphone 193 and the overview microphone 163 by 0.05, and 0.10 respectively.

Information from the cameras can also be leveraged to improve the quality of the audio content sent to the remote environment 102 through use of beamforming. For example, using the same example (i.e., the current speaker is visible on the back right camera 181), the visual data could be used to approximate the position of the current speaker relative to the microphones in the local environment 101, such as the overview microphone 163, the front microphone 173, and the back microphone 183. Using this positional information, the microphones 163, 173, 183 could then use beamforming to constructively enhance audio signals coming from the direction of the current speaker and constructively interfere with audio signals coming from other directions to improve the signal-to-noise ratio of the received audio signal that is sent to the remote environment 102.

Individuals and Groups

Figure 3:
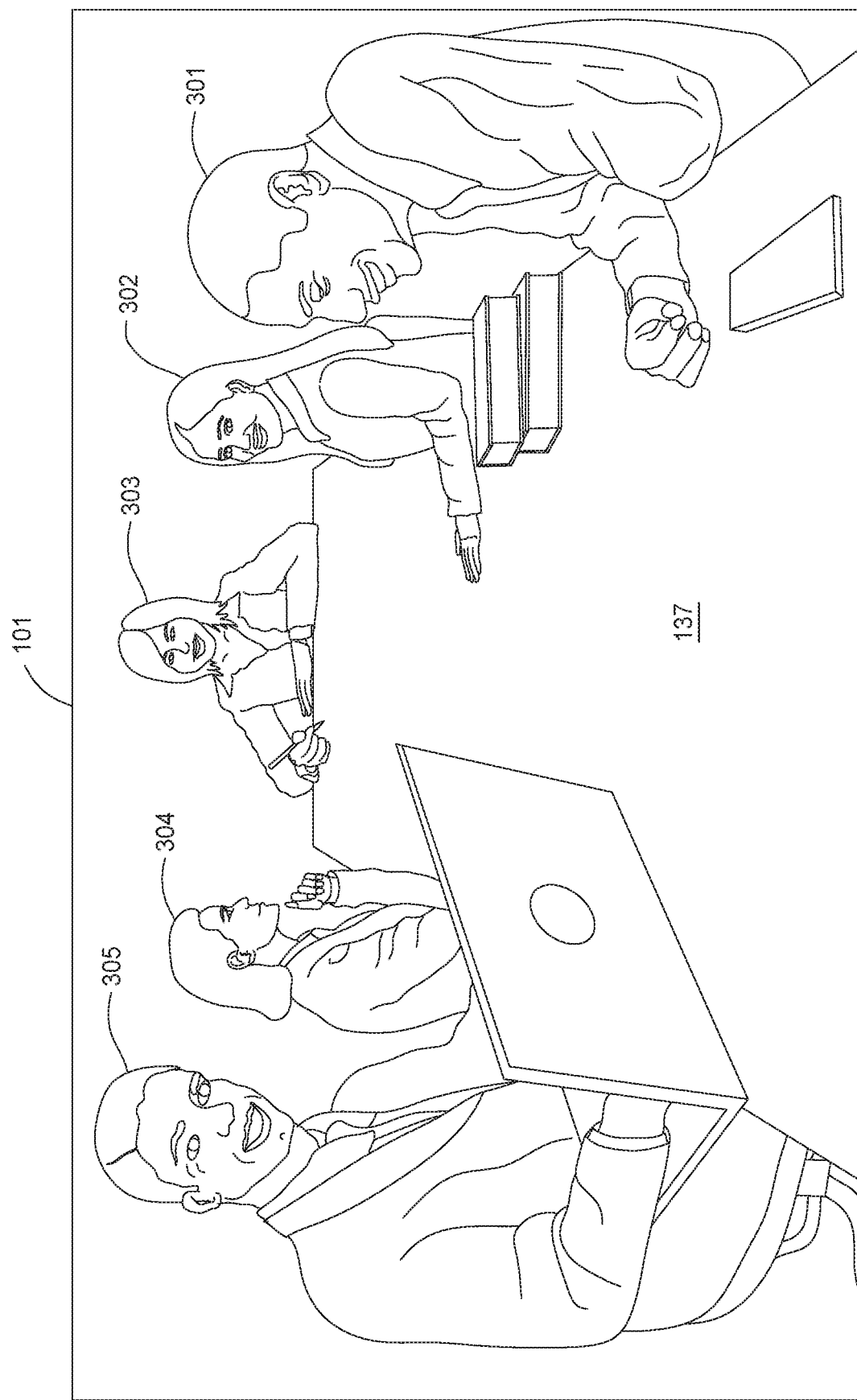
FIG. 3 illustrates a group of users sitting at the conference table in the local environment, according to one embodiment.

FIG. 3 illustrates a group of users 301-305 sitting at the conference table 137 in the local environment 101, according to one embodiment. Video conferences can also be improved by analyzing the activity and attributes of the users during the conference. For example, tracking of the movement or position of a current speaker can be used to determine that the head of the current speaker is turned and that another camera may be better suited to be the visual data source for the current speaker. Changes in audio signal strength received at the microphones (e.g., front microphone 173 and back microphone 183) can also be used as an indication that the head of the current speaker is turned in a specific direction, which can be used by the conference hub 110 to use another camera to capture the visual data of the current speaker.

In some video conferences, it may be desirable to keep a view on a particular key participant in the local environment 101, such as an important client attending the conference, main presenter or guest speaker. In some embodiments, facial recognition software running on one or more of the cameras and/or the conference hub 110 can be used to track the important participant and collect the relevant data being provided by the important participant. The audio can also be configured to increase the likelihood that the voice of the important participant is heard and then transferred to the conference hub 110 and to devices located in the remote environment 102 and the Internet environment 103. For example, voice recognition software can be used to identify the microphone with the strongest signal for the important participant's voice, and then this microphone can be used whenever the important participant speaks or throughout the duration of the video conference or as long as that microphone continues to receive the strongest signal for the important participant's voice. In another embodiment, the data confidence level for the microphone with the strongest signal from the important participant can be increased (e.g., by 0.1) to increase the likelihood that the voice of the important participant is heard and then transferred to the conference hub 110 and to devices located in the remote environment 102 and the Internet environment 103. In another embodiment, a microphone that has a data confidence level that is preset to a higher than average data confidence level within the software of the peripheral device itself or by the conference hub 110 is positioned near the important participant to increase the likelihood that the voice of the important participant is heard and then transferred to the conference hub 110 and to devices located in the remote environment 102 and the Internet environment 103.

For some situations, it may be desirable to detect particular speech patterns (e.g., frequencies) associated with particular groups of people, and use these detected speech patterns to increase the likelihood that speakers from that group are heard and/or seen during the video conference. For example, although not 100% accurate, speech patterns, such as audible frequency, can generally be used to distinguish between many male and female voices. Other speech patterns may be detected as well. Thus, if a host determines the voice of a group with a recognizable speech pattern should be increased, then the host can adjust the settings that control the switching of audio and/or visual data sources to favor the individuals of that group. For example, in one embodiment, if the host determines that voices of a particular group (e.g., soft spoken individuals, female voices, etc.) are not being sufficiently heard, then the host could make a change in the settings (e.g., settings on the conference hub 110) to help voices of the particular group (e.g., female voices) to be heard. Continuing the example, the settings could be configured to add a value, such as 0.1, to the data confidence level of the microphone that detects the highest audio signal of the particular group (e.g., female voices). Then if the conference hub 110 evaluates and/or selects an audio source based on the audio source with the highest data confidence level, the audio source having a data confidence level with an additional 0.1 can have an increased likelihood to be heard. Further, this may result in an increased likelihood of receiving more input from the particular group having an elevated data confidence level. Although the example is described with a 0.1 increase in data confidence level a higher or lower change could be used.

In another embodiment, if a particular group is determined to be controlling too much of the conversation during the conference, then the speech patterns of that group can be used to reduce the data confidence level of the microphones receiving the strongest signals from the members of that group to increase the likelihood that the voice of speakers from other groups can be heard. In yet another embodiment, facial or other visual recognition software can be used to identify members of a particular group or individual(s) known to belong to a particular group. In these embodiments, the facial or visual recognition software can be used on its own to identify members of particular groups or in conjunction with the speech pattern recognition to identify members of the particular groups. For example, a speech pattern recognition program may only be 85% accurate in identifying female voices while a speech pattern recognition program working in combination with a facial or other visual recognition program may be able to increase the accuracy to be above 95%. Once the members of the particular group are identified, then the software running on the conference hub 110 and/or peripheral devices can be used to increase the likelihood that members of an underrepresented group are heard from or reduce the likelihood that members from an overrepresented group are heard from, such as by adjusting the data confidence levels of microphones as described above.

Facial and/or visual recognition can also be applied to groups that are not mentioned above. For example, if a particular client has a uniform, such as a shirt of particular color, then the same techniques described above for modifying confidence values to favor particular groups could also be applied to identifying a group that is identifiable in this visual way. In another embodiment, location can also be used to increase the likelihood that particular voices are heard. For example, if speakers from the remote environment 102 are rarely heard from, then the volume from the microphones in the local environment can be reduced when speech from the remote environment is detected. Similarly, if speakers from the back of the conference table 137 are rarely heard from, then the data confidence level of the back microphone 183 can be increased and/or the data confidence level of the front microphone 173 can be decreased to account for this disparity. As another example, if lower level employees typically stand during a conference, then visual recognition software could be used to identify standing speakers and increase the data confidence level for the microphone which is receiving the strongest audio from the standing speaker.

Alternate Embodiments of Selecting Content

Figure 4:
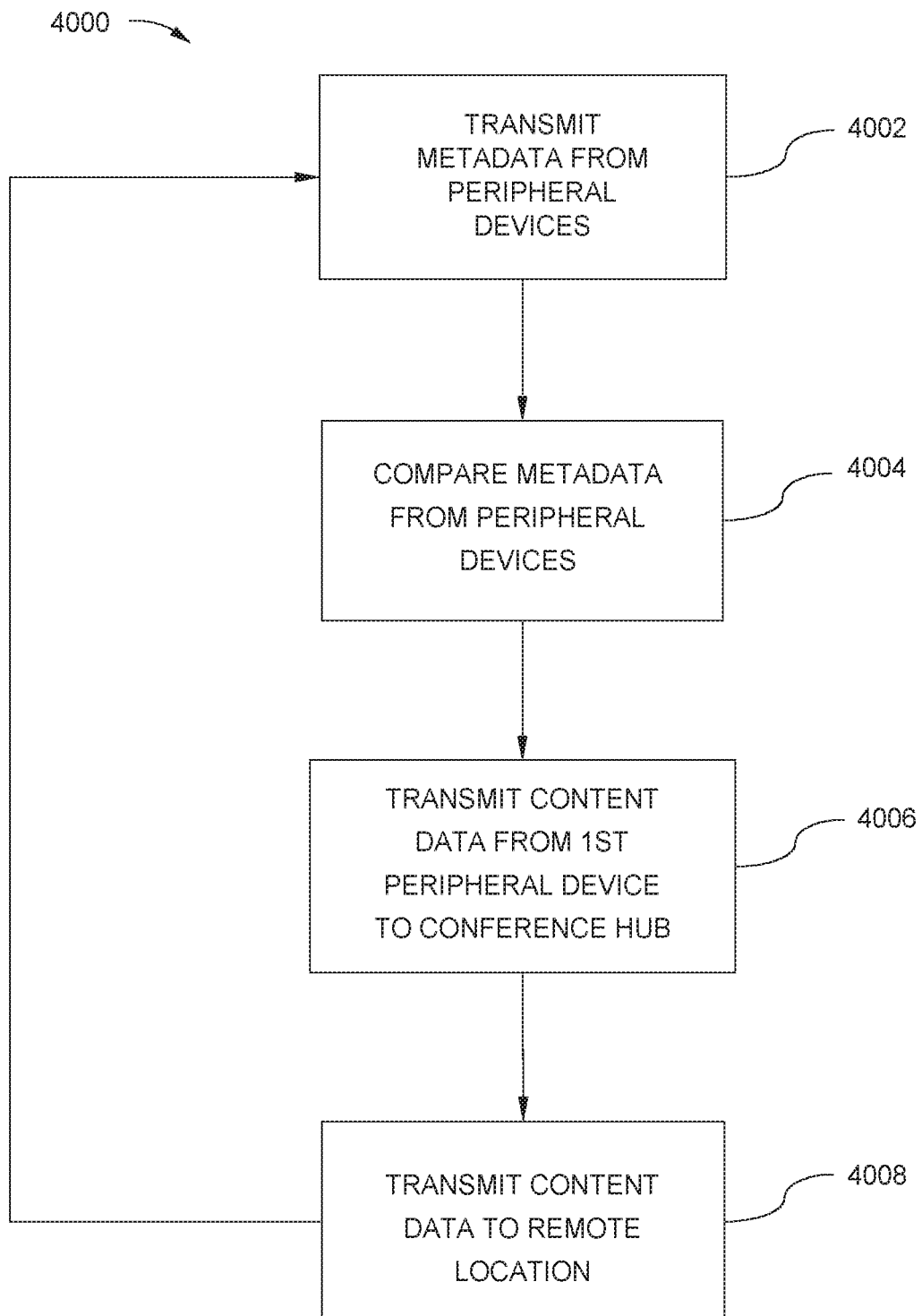
FIG. 4 is a process flow diagram of a method for selecting a source for delivering a first type of content data within the local environment and transmitting content data from the selected source to the remote environment, according to one embodiment.

FIG. 4 is a process flow diagram of a method 4000 for selecting a source (i.e., a peripheral device) for delivering a first type of content data (e.g., audio or visual data) within the local environment 101 and transmitting content data from the selected source to the remote environment 102, according to one embodiment. Referring to FIGS. 1A, 1B, and 4 the method 4000 is described. In some embodiments, the blocks found in the method 4000 can be repeated multiple times in an automated fashion by use of algorithms running on the various devices. Although the following method 4000 is described in reference to selecting the back right camera 181 to provide visual content to the remote environment 102 of a current speaker 5 (see FIG. 1B) standing near the right side of the whiteboard 192, the method 4000 also applies to selecting other peripheral devices to provide other visual content data or for selecting other peripheral devices to provide audio content data. Furthermore, although the method 4000 is described in reference to selecting the back right camera 181 when metadata from the cameras 171, 181, and 191 are transmitted and compared, the method 4000 also applies when metadata from more or fewer peripheral devices are compared. In the following description of the method 4000, the whiteboard camera 191 is the primary peripheral device. The selection of a particular peripheral device as the primary peripheral device can be static or dynamic as described above.

At block 4002, metadata is transmitted from one or more peripheral devices to either the conference hub 110 or to a primary peripheral device. For example, metadata can be transmitted from each of the cameras 171, 181, and 191 to the conference hub 110. Alternatively, metadata from each of the cameras 171, 181 can be transmitted to the whiteboard camera 191 acting as the primary peripheral device. In such an embodiment, the whiteboard camera 191 acting as the primary peripheral device does not transmit metadata since the whiteboard camera 191, which is acting as the primary peripheral device, can compare its own metadata with the metadata from the front right camera 171 and the back right camera 181.

At block 4004, the metadata from the cameras 171, 181, and 191 are compared to determine the content data from the back right camera 181 has a higher quality than the content data from the front right camera 171 and the whiteboard camera 191. This comparison can be done by the conference hub 110 or the whiteboard camera 191 acting as the primary peripheral device depending on which device the metadata was transmitted to at block 4002. In some embodiments, the peripheral device selected at block 4004 for having higher quality content data can also be the primary peripheral device.

At block 4004, the comparison can determine the content data from the back right camera 181 has a higher quality than the content data from the front right camera 171 and the whiteboard camera 191 based on determining the back right camera 181 has a better view of a current speaker 5 (see FIG. 1B) standing near the right side of the whiteboard 192 in the local environment 101. In one embodiment, determining the back right camera 181 has a better view of the current speaker 5 (e.g., content data has a higher quality) can be based on determining the content data from the back right camera 181 includes more of (1) a view of the current speaker, (2) an unobstructed view of the face of the current speaker, and (3) a view of an eye gaze of the current speaker than content data from the cameras 171, 191. In one embodiment, a view of an eye gaze of a current speaker is considered sufficient if the optical axis extending from the center of the lens of the camera is less than about 20 degrees, or even less than about 45 degrees from the direction the current speaker's eyes are looking, or, alternately, in some cases the speaker's face is oriented.

In other embodiments, views from different peripheral devices can be compared to determine which peripheral device has a better view of a key region (e.g., front of the conference room, podium in the conference room, the whiteboard 192, region of the whiteboard 192, region in front of whiteboard, etc.) in the local environment 101 as opposed to an individual (e.g., a current speaker). Determining a peripheral device (e.g., the back right camera 181) has a better view of a key region (e.g., the whiteboard 192) can be based on determining the content data from the back right camera 181 includes more of (1) a view of the key region, (2) an unobstructed view of the key region, or (3) a view of readable text in the key region than other peripheral devices.

In some embodiments, determining a peripheral device (e.g., the back right camera 181) has a better view of a current speaker or a key region can also be based at least in part on determining that the one or more other peripheral devices include a view of the current speaker or the key region with an interfering signal. In some embodiments, examples of interfering signals that can prevent a peripheral device from having a better view than other peripheral devices can include a distracting movement, white balance issues, other image color issues, reflections, glare, obstructed views (e.g., view of current speaker is obstructed by standing person or an object), or predefined areas of a room or parts of a scene that is desired to be blocked (e.g., as window or door opening).

As stated above, the method 4000 can also be executed for selecting audio content. Determining which peripheral device has higher quality audio content data at block 4004 can be performed, for example, by determining the content data from a first peripheral device (e.g., whiteboard microphone 193) includes a speech (e.g., audible sounds coming from a person) from of a current speaker and the content data from the second peripheral device (e.g., overview microphone 163) includes speech from the current speaker and unwanted audio. Unwanted audio can include audible sounds other than speech (e.g., shuffling papers).

At block 4006, content data from the back right camera 181 is transmitted to the conference hub 110 via the first communication link based on determining the content data from the back right camera 181 has a higher quality than the content data from the front right camera 171 and the whiteboard camera 191. In some embodiments, the metadata transmitted to the conference hub 110 or to the whiteboard camera 191 acting as the primary peripheral device can be transmitted via one or more communication links that are separate from the first communication link. Using a separate communication link can help reduce the likelihood that the transmission and processing of the content data can be slowed down by the transmission and processing of the metadata. For example, in one embodiment, the first communication link can be wired (e.g., an Ethernet communication link) and the one or more separate communication links can be wireless (e.g., a Bluetooth communication link). In other embodiments, the communication links can use a same technology, while still remaining separate, such as when the one or more first communication links are Wi-Fi communication links using a first frequency (e.g., 2.4 GHz) while the second communication link uses another frequency (e.g., 5.9 GHz).

At block 4008, the content data from the back right camera 181 (e.g., video of the current speaker 5 standing near the whiteboard 192) is transmitted to the remote video conferencing location 102 by the conference hub 110. As described above, the generated content data and metadata contain different information.

Figure 5A:
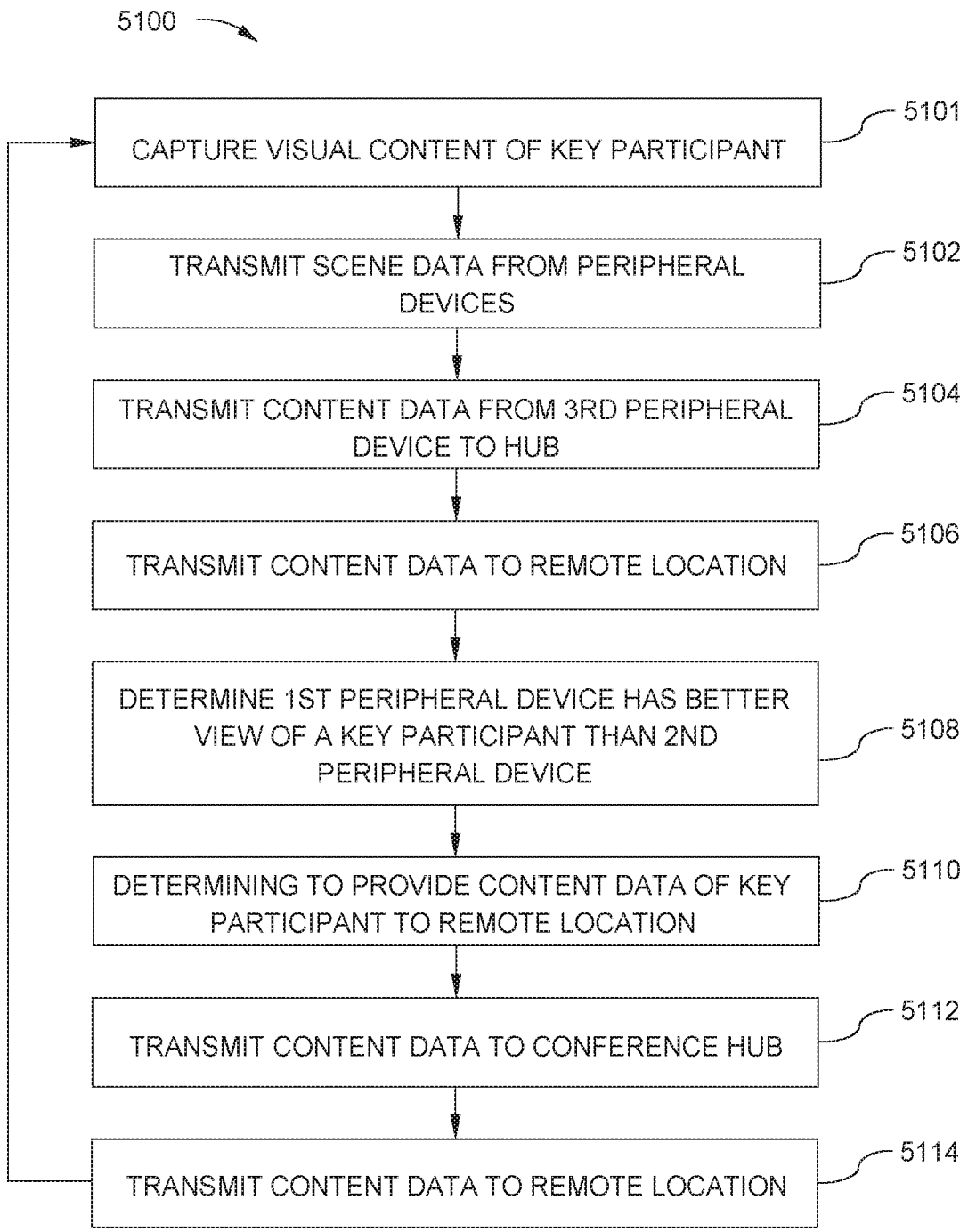
FIG. 5A is a process flow diagram of a method for selecting a source for providing visual content of a key participant in the local environment and transmitting content of the key participant from the selected source to the remote environment, according to one embodiment.

FIG. 5A is a process flow diagram of a method 5100 for selecting a source (i.e., a peripheral device) for providing visual content of a key participant 6 (see FIG. 1B) in the local environment 101 and transmitting content of the key participant 6 from the selected source to the remote environment 102, according to one embodiment. Referring to FIGS. 1A, 1B, and 5A the method 5100 is described. In some embodiments, the blocks found in the method 5100 can be repeated multiple times in an automated fashion by use of algorithms running on the various devices. Although the following method 5100 is described in reference to selecting the front right camera 171 to provide visual content of the key participant 6 standing in the front of the local environment 101, the method 5100 also applies to selecting other peripheral devices to provide visual content data of a key participant. Furthermore, although the method 5100 is described in reference to selecting the front right camera 171 when scene data from the front right camera 171 and the PTZ camera 162 are transmitted and compared, the method 5100 also applies when scene data from more peripheral devices are compared. In the following description of the method 5100, the front right camera 171 is the primary peripheral device. The selection of a particular peripheral device as the primary peripheral device can be static or dynamic as described above.

At block 5101, two or more peripheral devices (e.g., cameras) capture visual content of the key participant 6. For example, as shown in FIG. 1B, the front right camera 171 and the PTZ camera 162 are positioned to capture visual content of the key participant 6 standing at the front of the local environment 101 near the main display 135. Before block 5101, two or more of the peripheral devices, such as all of the cameras in the local environment 101, can be given data concerning the key participant 6, such as data that can be used for facial recognition or other identifiable features of the key participant 6. Peripheral devices capable of capturing visual content of the key participant 6 and which are not currently capturing other significant visual content (e.g., video of a current speaker who is not the key participant) can pan, tilt, zoom, and make any other adjustments needed to show the key participant 6.

At block 5102, scene data is transmitted from the front right camera 171 and the PTZ camera 162 via one or more first communication links to either the conference hub 110 or to a primary peripheral device during a first time period. The scene data can consist of one or more of content data, reduced quality content data, and metadata. Content data is content captured or generated by a device (e.g., audio or video recorded by the device or content from a display of an electronic device). Reduced quality content data is content data having a lower quality (e.g., lower video and/or audio resolution) relative to the corresponding content data from which the reduced quality content is generated and is typically transmitted to the remote environment 102 for viewing and/or listening. Using reduced quality content data can reduce the amount of data transmitted between devices and preserve bandwidth for transmitting other data. Metadata can include data confidence level(s), scene quality data, and other data that characterizes the content data as described above.

In some embodiments, each camera in the local environment 101 can be configured to track the key participant 6. The key participant 6 can be an important client, company executive, guest speaker or any other individual desired to be tracked during a meeting. As shown in FIG. 1B, an object 7 is located in front of the key participant 6 obstructing most of the cameras from being able to view the key participant 6. Thus, the front right camera 171 and the PTZ camera 162 are the only cameras that can obtain a sufficient view of the key participant 6 during the first time period.

At block 5104, as the key participant 6 is being tracked during the first time period by the front right camera 171 and the PTZ camera 162, while other visual content is being transmitted to the remote location 102 to provide the visual content of the on-going videoconference. For example, at block 5104, content data from the back right camera 181 is transmitted to the conference hub 110 via a second communication link during the first time period. The back right camera 181 can send content data of the current speaker 5 located at the whiteboard 192 during the first time period.

The second communication link can be separate from the one or more first communication links. Using a separate communication link can help reduce the likelihood that the transmission and processing of the content data transmitted to the remote environment 102 can be slowed down by the transmission and processing of the scene data transmitted at block 5202. In some embodiments, the separate second communication link can be separate from the one or more first communication links. For example, in one embodiment, the one or more first communication links can be wired (e.g., an Ethernet communication link) and the second communication link can be wireless (e.g., a Bluetooth communication link). In other embodiments, the communication links can use a same communication protocol, while still remaining separate, such as when the one or more first communication links are Wi-Fi communication links using a first frequency (e.g., 2.4 GHz) while the second communication link uses another frequency (e.g., 5.9 GHz).

At block 5106, the content data from the back right camera 181 can be transmitted by the conference hub 110 to the remote video conference location 102 during the first time period. Furthermore, in some embodiments, during the first time period content data of the key participant 6 is not transmitted to the remote environment 102. For example, if the key participant 6 is not speaking or otherwise doing something noteworthy (e.g., arriving, listening, exiting, gesturing, or standing up, etc.), then there is likely less of a reason to transmit content data of the key participant 6 to the conference hub 110 and/or remote environment 102. Thus, the transmitting of scene data by the front right camera 171 and the PTZ camera 162 can be configured to track the key participant 6 in the background at block 5102 during the first time period, so that content data of the key participant 6 can subsequently be quickly transmitted to remote environment 102 when the key participant 6 starts doing something noteworthy.

At block 5108, the scene data from the front right camera 171 and the PTZ camera 162 transmitted at block 5102 are compared to determine the front right camera 171 has a better view of the key participant 6 (e.g., content data has a higher quality) during the first time period than the PTZ camera 162. For example, as shown, the object 7 partially obstructs the view of the key participant 6 from the PTZ camera 162 while the view from the front right camera 171 is not obstructed. This comparison can be done by the conference hub 110 or the front right camera 171 acting as the primary peripheral device depending on which device the scene data was transmitted to at block 5102. Although the front right camera 171 is acting as the primary peripheral device in the description of method 5100, any of the peripheral devices in the local environment 101 can act as the primary peripheral device for the method 5100. In some embodiments, the peripheral device selected at block 5108 (i.e., the front right camera 171) for having the better view of the key participant 6 is also the primary peripheral device.

The comparison, performed during block 5108, can determine the content data from the front right camera 171 has a higher quality than the content data from the PTZ camera 162 based on determining the front right camera 171 has a better view of the key participant 6 (see FIG. 1B) standing in the front of the local environment 101. As stated above, one or more of content data, reduced quality content data, or metadata transmitted from the cameras 171, 162 can be compared to determine that the front right camera 171 has the better view of the key participant 6. In one embodiment, determining the front right camera 171 has a better view of the key participant 6 compared to the PTZ camera 162 can be based on determining the content data from the front right camera 171 includes more of (1) a view of the key participant 6, (2) an unobstructed view of the face of the key participant 6, and (3) a view of an eye gaze of the key participant 6 than content data from the PTZ camera 162. In one embodiment, a view of an eye gaze of the key participant 6 is considered sufficient if the optical axis extending from the center of the lens of the camera is within less than about 20 degrees, or even less than about 45 degrees from the direction the key participant 6's eyes are looking, or, alternately, in some cases the key participant's face is oriented. Here, the front right camera 171 has more of a view of the key participant 6, the face of the key participant 6 and the eye gaze of the key participant 6 (assuming the key participant is facing the table 137) than the PTZ camera 162 due to the object 7 obstructing some of the view of the key participant 6 from the PTZ camera 162.

In some embodiments, determining a peripheral device (e.g., the front right camera 171) has a better view of a key participant 6 can also be based at least in part on determining that the one or more other peripheral devices include a view of the key participant 6 with an interfering signal. In some embodiments, examples of interfering signals that can prevent a peripheral device from having a better view than other peripheral devices can include a distracting movement, white balance issues, other image color issues, reflections, glare, obstructed views (e.g., view of key participant 6 is obstructed by standing person or an object), or predefined areas of a room or parts of a scene that is desired to be blocked (e.g., as window or door opening). For example, the view from the PTZ camera 162 of the key participant 6 is partially obstructed by the object 7 as shown in FIG. 1B, which is treated as an interfering signal preventing the PTZ camera 162 from having a better view than the front right camera 171.

At block 5110, a determination is made to provide content data of the key participant 6 to the remote environment 102 during a second time period. The second time period is after the first time period has elapsed. A determination to provide content data of the key participant 6 can be made when the key participant 6 starts speaking or otherwise doing something noteworthy (e.g., arriving, exiting, gesturing, or standing up, etc.). For example, one or more peripheral devices and/or the conference hub 110 can be given voice recognition data concerning the key participant 6, so that audio data can be used to determine when the key participant 6 starts speaking and enable the determination to provide content of the key participant 6 to be made. As another example, data from one or more peripheral devices capturing visual content of the key participant 6, such as cameras 171, 162, can be used to identify when the key participant 6 is doing something noteworthy (e.g., arriving, exiting, gesturing, or standing up, etc.) enabling the determination to provide content of the key participant 6 to be made At block 5112, content data from the front right camera 171 is transmitted to the conference hub 110 via the second communication link during the second time period based on the determination that the front right camera 171 has the better view of the key participant 6 (e.g., content data has a higher quality) during the first time period and the determining to provide content data of the key participant 6 during the second time period.

At block 5114, the content data of the key participant 6 from the front right camera 171 is transmitted by the conference hub 110 to the remote environment 102 during the second time period.

Figure 5B:
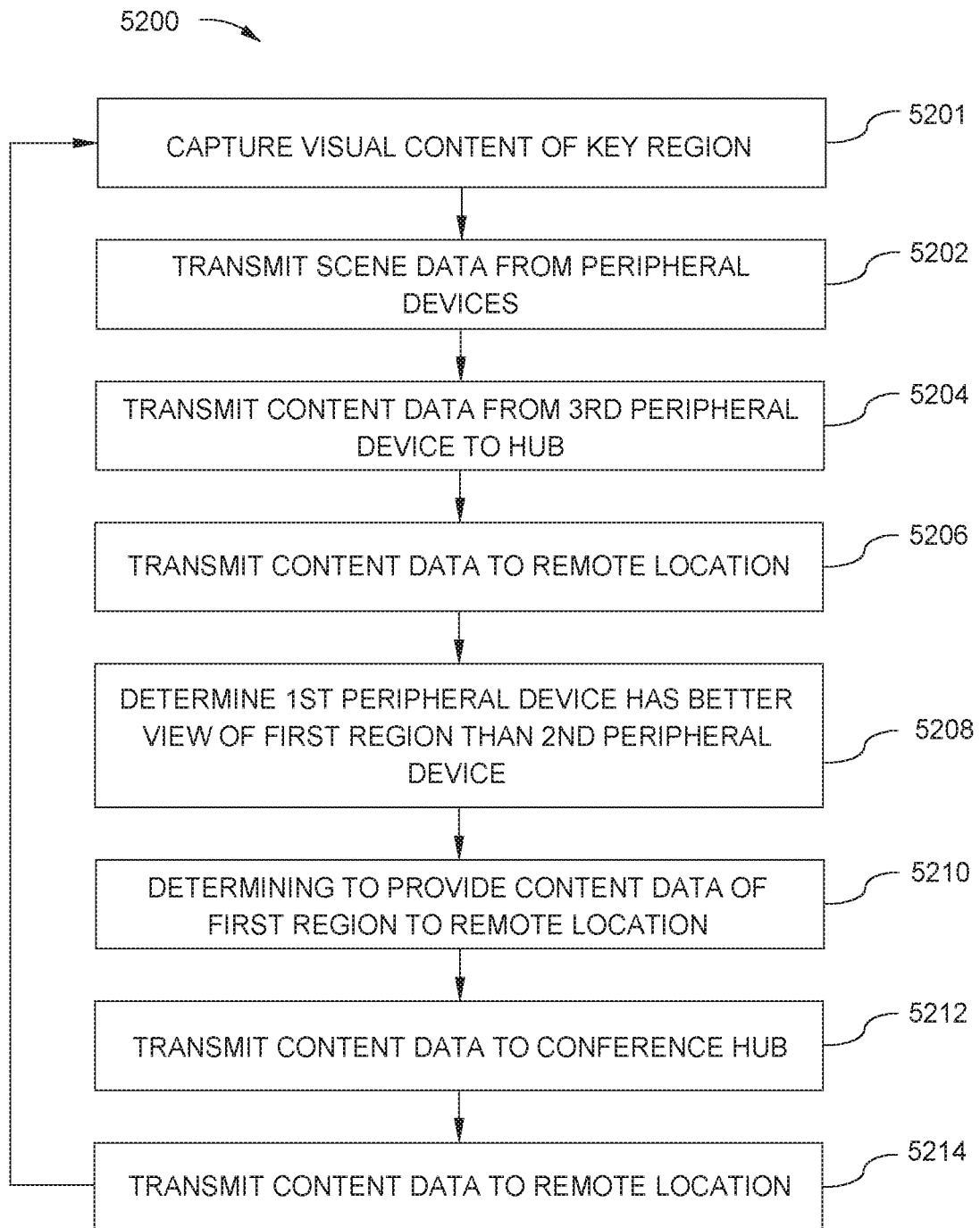
FIG. 5B is a process flow diagram of a method for selecting a source for providing visual content of a key region in the local environment and transmitting content of the key region from the selected source to the remote environment, according to one embodiment.

FIG. 5B is a process flow diagram of a method 5200 for selecting a source (i.e., a peripheral device) for providing visual content of a key region 8 (see FIG. 1B) in the local environment 101 and transmitting content of the key region 8 from the selected source to the remote environment 102, according to one embodiment. Referring to FIGS. 1A, 1B, and 5B the method 5200 is described. In some embodiments, the blocks found in the method 5200 can be repeated multiple times in an automated fashion by use of algorithms running on the various devices. Although the following method 5200 is described in reference to selecting the front right camera 171 to provide visual content of the key region 8 near the main display 135 located at the front of the local environment 101, the method 5200 also applies to selecting other peripheral devices to provide visual content data of the key region 8 or other key regions. Furthermore, although the method 5200 is described in reference to selecting the front right camera 171 when scene data from the front right camera 171 and the PTZ camera 162 are transmitted and compared, the method 5200 also applies when scene data from more peripheral devices are compared. In the following description of the method 5200, the front right camera 171 is the primary peripheral device. The selection of a particular peripheral device as the primary peripheral device can be static or dynamic as described above.

At block 5201, two or more peripheral devices (e.g., cameras) capture visual content of the key region 8. For example, as shown in FIG. 1B, the front right camera 171 and the PTZ camera 162 are positioned to capture visual content of the key region 8. The overview camera 161 and the front left camera area 172 are also positioned to capture visual content of the key region 8, but are not included in the following description due to the view from these cameras 161, 172 being more obstructed by the object 7 than the cameras 171, 162. Before block 5201, two or more of the peripheral devices, such as all of the cameras in the local environment 101, can be given data concerning the key region 8, such as image data that can be used to identify the key region 8, such as image data of the main display 135 and/or image data of areas around the perimeter of the main display 135. In some embodiments, a marker (e.g., an "X") or other identifiable feature can be placed around the four corners and/or other locations on the main display 135 to enable (1) visual peripheral devices (e.g., cameras) or (2) other peripheral devices or the conference hub 110 receiving image data to determine how much of the main display 135 is captured in a particular image or video. Peripheral devices capable of capturing visual content of the key region 8 and which are not currently capturing other significant visual content (e.g., video of a current speaker who is not in the key region 8) can pan, tilt, zoom, and make any other adjustments needed to view the key region 8.

At block 5202, scene data is transmitted from the front right camera 171 and the PTZ camera 162 via one or more first communication links to either the conference hub 110 or to a primary peripheral device during a first time period. The scene data can consist of one or more of content data, reduced quality content data, and metadata. Content data is content captured or generated by the device (e.g., audio or video recorded by the device or content from a display of an electronic device). Reduced quality content data is content data having a lower quality (e.g., lower resolution) relative to the corresponding content data from which the reduced quality content is generated. Using reduced quality content data can reduce the amount of data transmitted between devices and preserve bandwidth for transmitting other data. Metadata can include data confidence level(s), scene quality data, and other data that characterizes the content data as described above.

In some embodiments, each camera in the local environment 101 with a view of at least a portion of the key region 8 can be configured to track activity within the key region 8. The key region 8 can be any region of the local environment 101 that is desired to be tracked during a meeting. Here, the key region 8 is a region that includes the front of the main display 135 and an adjacent surrounding area. The key region 8 is a region typically associated with where a main speaker for a presentation is located during a videoconference. As shown in FIG. 1B, the key participant 6 is located in the key region 8, and an object 7 is located in front of the key participant 6 obstructing most of the cameras from being able to view the key participant 6. Thus, the front right camera 171 and the PTZ camera 162 are the only cameras that can obtain a sufficient view of the key participant 6 in the key region 8 during the first time period.

At block 5204, as the key region 8 is being tracked during the first time period by the front right camera 171 and the PTZ camera 162, other visual content is being transmitted to provide the visual content for the videoconference. For example, at block 5104, content data from the back right camera 181 is transmitted to the conference hub 110 via a second communication link during the first time period. The back right camera 181 can send content data of the current speaker 5 located at the whiteboard 192 during the first time period.

The second communication link can be separate from the one or more first communication links. Using a separate communication link can help reduce the likelihood that the transmission and processing of the content data transmitted to the remote environment 102 can be slowed down by the transmission and processing of the scene data transmitted at block 5202. In some embodiments, the second communication link can be separate from the one or more first communication links. For example, in one embodiment, the one or more first communication links can be wired (e.g., an Ethernet communication link) and the second communication link can be wireless (e.g., a Bluetooth communication link). In other embodiments, the communication links can use a same communication protocol, while still remaining separate, such as when the one or more first communication links are Wi-Fi communication links using a first frequency (e.g., 2.4 GHz) while the second communication link uses another frequency (e.g., 5.9 GHz).

At block 5206, the content data from the back right camera 181 can be transmitted by the conference hub 110 to the remote video conference location 102 during the first time period. Furthermore, in some embodiments, during the first time period content data of the key region 8 is not transmitted to the remote environment 102. For example, if no one is speaking or otherwise doing something noteworthy (e.g., pointing, gesturing, or moving etc.) in the key region 8, then there is likely less of a reason to transmit content data of the key region 8 to the conference hub 110 and/or remote environment 102. Thus, the transmitting of scene data by the front right camera 171 and the PTZ camera 162 can be configured to track the key region 8 in the background at block 5202 during the first time period, so that content data of the key region 8 can subsequently be quickly transmitted to remote environment 102 when someone or something in the key region 8 (e.g., the key participant 6) starts doing something noteworthy.

At block 5208, the scene data from the front right camera 171 and the PTZ camera 162 transmitted at block 5202 are compared to determine the front right camera 171 has a better view of the key region 8 (e.g., content data has a higher quality) during the first period than the PTZ camera 162. For example, as shown, the object 7 partially obstructs the view of the key region 8 from the PTZ camera 162 while the view from the front right camera 171 is not obstructed. This comparison can be done by the conference hub 110 or the front right camera 171 acting as the primary peripheral device depending on which device the scene data was transmitted to at block 5202. Although the front right camera 171 is acting as the primary peripheral device in the description of method 5200, any of the peripheral devices in the local environment 101 can act as the primary peripheral device for the method 5200. In some embodiments, the peripheral device selected at block 5208 (i.e., the front right camera 171) for having the better view of the key region 8 is also the primary peripheral device.

At block 5208, the comparison can determine the content data from the front right camera 171 has a higher quality than the content data from the PTZ camera 162 based on determining the front right camera 171 has a better view of the key region 8 at the front of the local environment 101. As stated above, one or more of content data, reduced quality content data, or metadata transmitted from the cameras 171, 162 can be compared to determine that the front right camera 171 has the better view of the key region 8. In one embodiment, determining the front right camera 171 has a better view of the key region 8 can be based on determining the content data from the front right camera 171 includes more of (1) a view of a key object (e.g., the main display 135) in the key region 8, (2) an unobstructed view of the face of a first participant (e.g., the key participant 6) in the key region 8, and (3) a view of an eye gaze of a first participant (e.g., key participant 6) positioned in the key region 8 than content data from the PTZ camera 162. In one embodiment, a view of an eye gaze of the key participant 6 is considered sufficient if the optical axis extending from the center of the lens of the camera is less than about 20 degrees, or even less than about 45 degrees from the direction the key participant's eyes are looking, or, alternately, in some cases the speaker's face is oriented. Here the front right camera 171 has more of a view of the main display 135 (i.e., the key object) in the key region 8 than the PTZ camera 162. Also, the front right camera 171 has more of a view of the face of the key participant 6 and the eye gaze of the key participant 6 (assuming the key participant 6 is facing the table 137) located in the key region 8 than the PTZ camera 162 due to the object 7 obstructing some of the view of the key participant 6 from the PTZ camera 162.

In some embodiments, determining a peripheral device (e.g., the front right camera 171) has a better view of a key participant can also be based at least in part on determining that the one or more other peripheral devices include a view of the key region 8 with an interfering signal. In some embodiments, examples of interfering signals that can prevent a peripheral device from having a better view than other peripheral devices can include a distracting movement, white balance issues, other image color issues, reflections, glare, obstructed views (e.g., view of key region 6 is obstructed by standing person or an object), or predefined areas of a room or parts of a scene that is desired to be blocked (e.g., as window or door opening). For example, the view from the PTZ camera 162 of the key region 8 is partially obstructed by the object 7 as shown in FIG. 1B, which is treated as an interfering signal preventing the PTZ camera 162 from having a better view than the front right camera 171.

At block 5210, a determination is made to provide content data of the key region 8 to the remote environment 102 during a second time period. The second time period is after the first time period has elapsed. A determination to provide content data of the key region 8 can be made when a participant in the key region 8 (e.g., the key participant 6) starts speaking or otherwise doing something noteworthy (e.g., gesturing). For example, one or more audio peripheral devices (e.g., microphones) can be used to determine when a participant starts speaking in the key region 8 and enable the determination to provide visual content of the key region 8 to be made. As another example, data from one or more peripheral devices capturing visual content of the key region 8, such as cameras 171, 162, can be used to identify when a participant (e.g., key participant 6) is doing something noteworthy in the key region 8 (e.g., gesturing) enabling the determination to provide content of the key region 8 to be made.

At block 5212, content data from the front right camera 171 is transmitted to the conference hub 110 via the second communication link during the second time period based on the determination that the front right camera 171 has the better view of the key region 8 (e.g., content data has a higher quality) during the first time period and the determining to provide content data of the key region 8 during the second time period.

At block 5214, the content data of the key region 8 from the front right camera 171 is transmitted by the conference hub 110 to the remote environment 102 during the second time period.

Figure 5C:
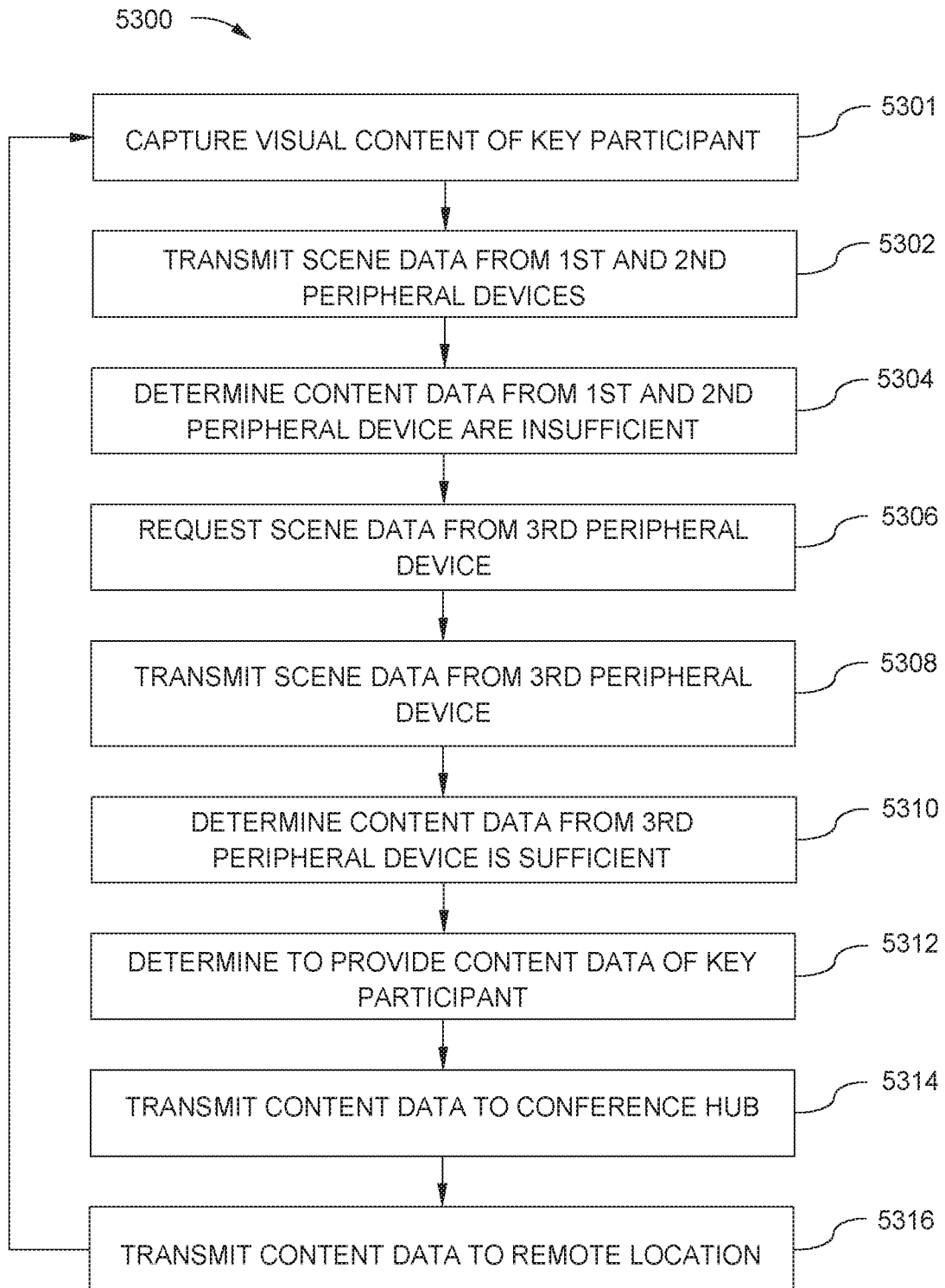
FIG. 5C is a process flow diagram of a method for selecting a source for providing visual content of a key participant in the local environment and transmitting content of the key participant from the selected source to the remote environment, according to one embodiment.

FIG. 5C is a process flow diagram of a method 5300 for selecting a source (i.e., a peripheral device) for providing visual content of a key participant 6 (see FIG. 1B) in the local environment 101 and transmitting content of the key participant 6 from the selected source to the remote environment 102, according to one embodiment. The method 5300 describes how tracking of the key participant 6 can be adjusted when visual content captured by the peripheral devices (i.e., cameras) becomes insufficient, for example, when the key participant moves from a first position $6_{t1}$ during a first time period to a second position $6_{t2}$ during a second time period. The key participant is shown as key participant 6' in the first position $6_{t1}$ and key participant 6 in the second position $6_{t2}$ for clarity. Referring to FIGS. 1A, 1B, and 5C the method 5300 is described. In some embodiments, the blocks found in the method 5300 can be repeated multiple times in an automated fashion by use of algorithms running on the various devices. Although the following method 5300 is described in reference to selecting the front right camera 171 to provide visual content of the key participant 6 standing in the second position $6_{t2}$ at the front of the local environment 101, the method 5300 also applies to selecting other peripheral devices to provide visual content data of a key participant. In the following description of the method 5300, the back left camera 182 is the primary peripheral device. The selection of a particular peripheral device as the primary peripheral device can be static or dynamic as described above.

At block 5301, during the first time period, the key participant is located in the first position $6_{t1}$ (i.e., key participant 6'), for example seated at the rear of the conference table 137 facing the main display 135. The back right camera 181 and the back left camera 182 capture visual content of the key participant 6' during this first time period. Before block 5301, two or more of the peripheral devices, such as all of the cameras in the local environment 101, can be given data concerning the key participant, such as data that can be used for facial recognition or to recognize other identifying features of the key participant. Peripheral devices capable of capturing visual content of the key participant and which are not currently capturing other significant visual content (e.g., video of a current speaker who is not the key participant) can pan, tilt, zoom, and make any other adjustments needed to show the key participant 6'. Peripheral devices which are not positioned to capture visual content of the key participant 6' (e.g., the face of the key participant) can stop attempting to track the key participant 6' during such time periods. For example, during the first time period when the key participant 6' is in the first position $6_{t1}$, the cameras 161, 162, 171, 172, and 191 are not tracking the key participant 6 because the face of the key participant 6' is not in the view of these cameras. Thus, during the first time period, the only cameras capturing visual content of the key participant 6' located at the first position $6_{t1}$ are the back right camera 181 and the back left camera 182.

At block 5302, after the key participant moves to the second position $6_{t2}$ (i.e., key participant 6) during a second time period, scene data is transmitted from the back right camera 181 and the back left camera 182 via a first communication link to either the conference hub 110 or to a primary peripheral device. Because the key participant has moved to the second position $6_{t2}$, the key participant 6 is no longer in the view of the cameras 181, 182. The scene data can consist of one or more of content data, reduced quality content data, and metadata. Content data is content captured or generated by the device (e.g., visual content recorded by the device). Reduced quality content data is content data having a lower quality (e.g., lower resolution) relative to the corresponding content data from which the reduced quality content is generated. Using reduced quality content data can reduce the amount of data transmitted between devices and preserve bandwidth for transmitting other data. Metadata can include data confidence level(s), scene quality data, and other data that characterizes the content data as described above.

At block 5304, the scene data from the back right camera 181 and the back left camera 182 transmitted at block 5304 are analyzed to determine content data from the back right camera 181 and the back left camera 182 are insufficient for providing quality content data of the key participant 6 during the second time period. This analysis can be done by the conference hub 110 or the back left camera 182 acting as the primary peripheral device depending on which device the scene data was transmitted to at block 5102. Content data can be determined to be insufficient when (1) the key participant is not included in the content data, (2) the face of the key participant is not included in the content data, or (3) an eye gaze of the key participant is not included in the content data. What is considered insufficient content data from one or more peripheral devices can be based on what is included in the content data from one or more other peripheral devices. For example, if the content data from all of the peripheral devices does not include the key participant, then content data only showing the key participant without showing the face or eye gaze of the key participant may not be considered insufficient. Conversely, if two or more other peripheral devices show the eye gaze of the key participant, then content data from a particular peripheral device including the face of the key participant may be considered insufficient if the content data does not also include the eye gaze of the key participant. As shown in FIG. 1B, when the key participant moves to the second position $6_{t2}$ (i.e., key participant 6) during the second time period, then the content data from the back right camera 181 and the back left camera 182 are considered insufficient because the key participant is no longer included in the content data of the back right camera 181 and the back left camera 182.

At block 5306, a request for scene data concerning the key participant 6 is transmitted to one or more other visual peripheral devices (e.g., cameras) during the second time period. The second time period occurs after the first time period has elapsed. In some embodiments, the request can be sent to every other camera in the local environment 101. Cameras that are not currently capturing something significant (e.g., a current speaker other than the key participant 6 at another location in the local environment 101) can then respond to the request by attempting to search for the key participant using facial recognition data or other data configured to identify the key participant that are supplied to the cameras. The attempts to search for the key participant can include panning, tilting, zooming, and other adjustments by the camera(s).

At block 5308, peripheral devices, such as the front right camera 171 and the PTZ camera 162 can respond to the request received at block 5306 and capture content data of the key participant 6 standing at the second position $6_{t2}$ during the second time period. These peripheral devices (i.e., cameras 171, 162) can then transmit scene data at block 5308 via the first communication link to either the conference hub 110 or to the primary peripheral device (i.e., back left camera 182) during the second time period.

At block 5310, the scene data from the front right camera 171 and the PTZ camera 162 transmitted at block 5308 can then be analyzed to determine content data from the front right camera 171 and the PTZ camera 162 are sufficient for providing quality content data of the key participant 6 during the second time period. Content data can be determined to be sufficient when (1) the key participant is included in the content data, (2) the face of the key participant is included in the content data, or (3) an eye gaze of the key participant is included in the content data. What is considered sufficient content data from one or more peripheral devices can be based on what is included in the content data from one or more other peripheral devices. For example, if the content data from all of the other peripheral devices does not include the key participant, then content data only showing the key participant 6 without showing the face or eye gaze of the key participant 6 may be considered sufficient. Conversely, if two or more other peripheral devices show the eye gaze of the key participant 6, then content data from a particular peripheral device including the face of the key participant 6 may not be considered sufficient if the content data does not also include the eye gaze of the key participant 6. As shown in FIG. 1B, when the key participant moves to the second position 6$_{t2}$ (i.e., key participant 6) during the second time period, then the content data from the front right camera 171 and the PTZ camera 162 can both be considered sufficient because the key participant 6 as well as the face and eye gaze of the key participant 6 is included in the content data of the front right camera 171 and the PTZ camera 162 assuming the key participant is facing the table 137 and the object 7 does not completely obstruct the face and eye gaze of the key participant 6 when viewed from the PTZ camera 162.

At block 5312, the scene data from the front right camera 171 and the PTZ camera 162 transmitted at block 5308 are compared to determine the front right camera 171 has a better view of the key participant 6 (e.g., content data has a higher quality) during the second time period than the PTZ camera 162. For example, as shown, the object 7 partially obstructs the view of the key participant 6 from the PTZ camera 162 while the view from the front right camera 171 is not obstructed. This comparison can be done by the conference hub 110 or the back left camera 182 acting as the primary peripheral device depending on which device the scene data was transmitted to at block 5308. Although the back left camera 182 is acting as the primary peripheral device in the description of method 5300, any of the peripheral devices in the local environment 101 can act as the primary peripheral device for the method 5300. For example, after the key participant 6 leaves the view of the back left camera 182, then one of the cameras (e.g., the front right camera 171) having a view of the key participant 6 can become the primary peripheral device. Thus, in some embodiments, the peripheral device selected at block 5312 (i.e., the front right camera 171) for having the better view of the key participant 6 can also be the primary peripheral device.

At block 5312, the comparison can determine the content data from the front right camera 171 has a higher quality than the content data from the PTZ camera 162 based on determining the front right camera 171 has a better view of the key participant 6 (see FIG. 1B) standing in the front of the local environment 101. As stated above, one or more of content data, reduced quality content data, or metadata transmitted from the cameras 171, 162 can be compared to determine that the front right camera 171 has the better view of the key participant 6. In one embodiment, determining the front right camera 171 has a better view of the key participant 6 compared to the PTZ camera 162 can be based on determining the content data from the front right camera 171 includes more of (1) a view of the key participant 6, (2) an unobstructed view of the face of the key participant 6, and (3) a view of an eye gaze of the key participant 6 than content data from the PTZ camera 162. In one embodiment, a view of an eye gaze of the key participant 6 is considered sufficient if the optical axis extending from the center of the lens of the camera is less than about 20 degrees, or even less than about 45 degrees of the direction the key participant's eyes are looking, or, alternately, in some cases the speaker's face is oriented. Here, the front right camera 171 has more of a view of (1) the key participant 6, (2) the face of the key participant 6 and (3) the eye gaze of the key participant 6 (assuming the key participant 6 is facing the table 137) than the PTZ camera 162 due to the object 7 obstructing some of the view of the key participant 6 from the PTZ camera 162.

In some embodiments, determining a peripheral device (e.g., the front right camera 171) has a better view of a key participant 6 can also be based at least in part on determining that the one or more other peripheral devices include a view of the key participant 6 with an interfering signal. In some embodiments, examples of interfering signals that can prevent a peripheral device from having a better view than other peripheral devices can include a distracting movement, white balance issues, other image color issues, reflections, glare, obstructed views (e.g., view of key participant 6 is obstructed by standing person or an object), or predefined areas of a room or parts of a scene that is desired to be blocked (e.g., as window or door opening). For example, the view from the PTZ camera 162 of the key participant 6 is partially obstructed by the object 7 as shown in FIG. 1B, which is treated as an interfering signal preventing the PTZ camera 162 from having a better view than the front right camera 171.

At block 5313, a determination is made to provide content data of the key participant 6 to the remote environment 102 during a third time period. The third time period is after the second time period has elapsed. A determination to provide content data of the key participant 6 can be made when the key participant 6 starts speaking or otherwise doing something noteworthy (e.g., arriving, exiting, gesturing, or standing up, etc.). For example, one or more audio peripheral devices and/or the conference hub 110 can be given voice recognition data concerning the key participant 6, so that audio data can be used to determine when the key participant 6 starts speaking and enable the determination to provide content of the key participant 6 to be made.

At block 5314, content data from the front right camera 171 is transmitted to the conference hub 110 via the second communication link during the third time period based on the determination that the front right camera 171 has the better view of the key participant 6 during the second time period and the determining to provide content data of the key participant 6 during the third time period.

At block 5316, the content data of the key participant 6 from the front right camera 171 is transmitted by the conference hub 110 to the remote environment 102 during the second time period.

Figure 6:
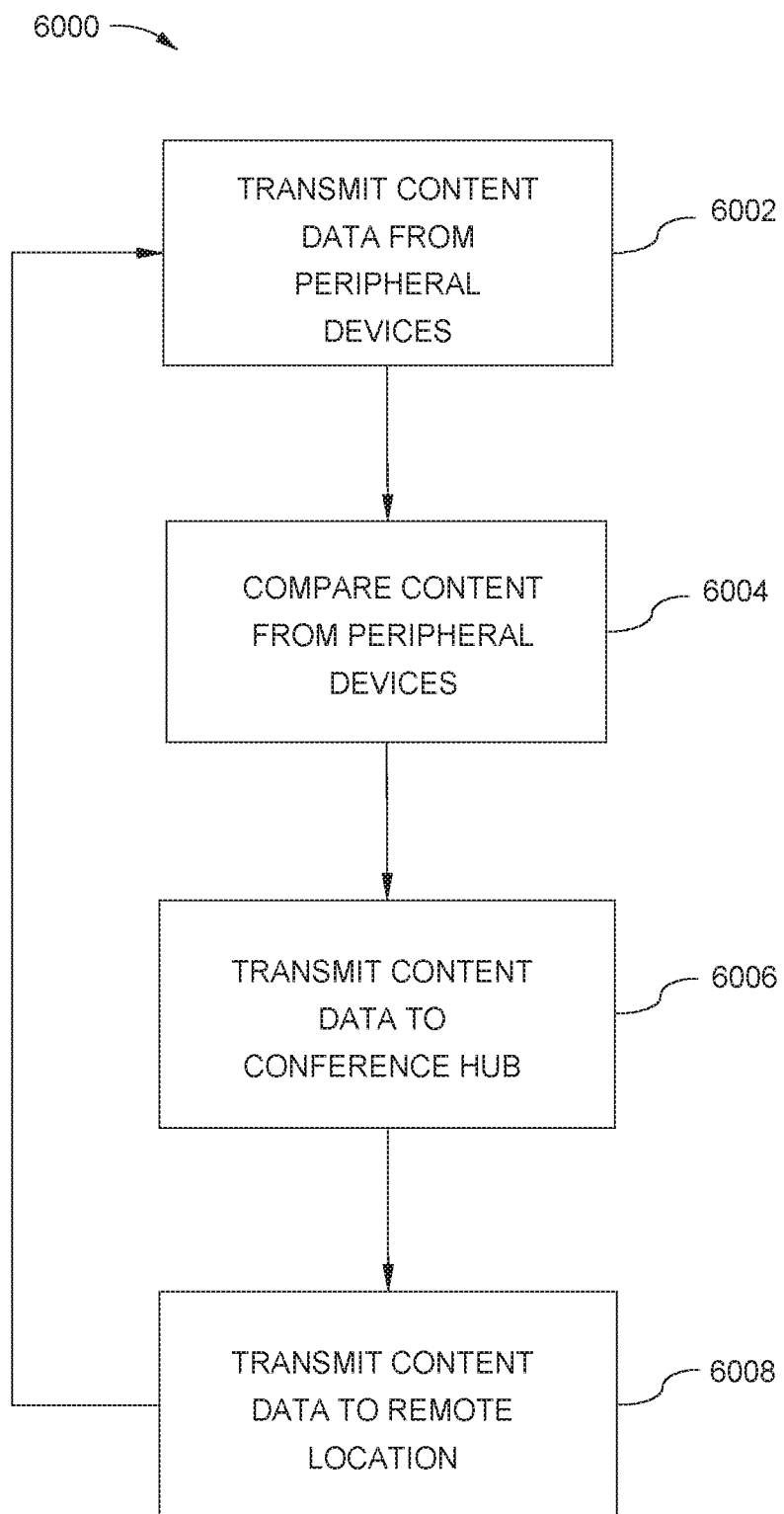
FIG. 6 is a process flow diagram of a method for selecting a source for a first type of content in the local environment and transmitting content from the selected source to the remote environment, according to one embodiment.

FIG. 6 is a process flow diagram of a method 6000 for selecting a source (i.e., a peripheral device) for a first type of content (e.g., audio or visual data) in the local environment 101 and transmitting content from the selected source to the remote environment 102, according to one embodiment. Referring to FIGS. 1A, 1B, and 6 the method 6000 is described. In some embodiments, the blocks found in the method 6000 can be repeated multiple times in an automated fashion by use of algorithms running on the various devices. The method 6000 is similar to the method 4000 described in reference to FIG. 4 except that in the method 6000 content data from peripheral devices are compared instead of metadata from the peripheral devices, which is compared in the method 4000. Furthermore, the method 6000 like the method 4000 is similarly described as selecting the back right camera 181 to provide visual content to the remote environment 102.

Although the following method 6000 is described in reference to selecting the back right camera 181 to provide visual content to the remote environment 102 of a current speaker 5 (see FIG. 1B) standing near the right side of the whiteboard 192, the method 6000 also applies to selecting other peripheral devices to provide other visual content data or for selecting other peripheral devices to provide audio content data. Furthermore, although the method 6000 is described in reference to selecting the back right camera 181 when content data from the cameras 171, 181, and 191 are transmitted and compared, the method 6000 also applies when content data from more or fewer peripheral devices are compared. In the following description of the method 6000, the whiteboard camera 191 is the primary peripheral device. The selection of a particular peripheral device as the primary peripheral device can be static or dynamic as described above.

At block 6002, a first set of content data is transmitted from one or more peripheral devices to either the conference hub 110 or to a primary peripheral device. For example, a first set of content data can be transmitted from each of the cameras 171, 181, and 191 to the conference hub 110. Alternatively, content data from each of the cameras 171, 181 can be transmitted to the whiteboard camera 191 acting as the primary peripheral device. In such embodiments, the whiteboard camera 191 acting as the primary peripheral device does not transmit a first set of content data since the whiteboard camera 191 acting as the primary peripheral device can compare its own first set of content data with the content data from the front right camera 171 and the back right camera 181.

In some embodiments, the first set of content data that is transmitted at block 6002 has similar properties (e.g., resolution, frame rate, etc.) relative to the content data (e.g., a video feed) that is actually transmitted to the remote environment 102. In other embodiments, the first set of content data that is transmitted at block 6002 contains less data relative to the content data that is actually transmitted to the remote environment 102. For example, the first set of content data can have a lower resolution or frame rate relative to the content data that is actually transmitted to the remote environment 102. In some embodiments, the first set of content data may only include a snapshot, such as a single frame of visual data. Reducing the size of the first set of content data can help prevent transmission and processing of the first set of content data from slowing down the processing and transmission of the content data (e.g., video and audio of a current speaker) that is actually transmitted to the remote environment 102 during a videoconference.

At block 6004, the content data from the from the cameras 171, 181, and 191 are compared to determine the content data from the back right camera 181 has a higher quality than the content data from the front right camera 171 and the whiteboard camera 191. This comparison can be done by the conference hub 110 or the whiteboard camera 191 acting as the primary peripheral device depending on which device the first sets of content data were transmitted to at block 6002. In some embodiments, the peripheral device selected at block 6004 for having higher quality content data can also be the primary peripheral device.

At block 6004, the comparison can determine the content data from the back right camera 181 has a higher quality than the content data from the front right camera 171 and the whiteboard camera 191 based on determining the back right camera 181 has a better view of a current speaker 5 (see FIG. 1B) standing near the right side of the whiteboard 192 in the local environment 101. In one embodiment, determining the back right camera 181 has a better view of the current speaker 5 can be based on determining the content data from the back right camera 181 includes more of (1) a view of the current speaker, (2) an unobstructed view of the face of the current speaker, and (3) a view of an eye gaze of the current speaker than content data from the cameras 171, 191. In one embodiment, a view of an eye gaze of a current speaker is considered sufficient if the optical axis extending from the center of the lens of the camera is less than about 20 degrees, or even less than about 45 degrees from the direction the current speaker's eyes are looking, or, alternately, in some cases the speaker's face is oriented.

In other embodiments, views from different peripheral devices can be compared to determine which peripheral device has a better view of a key region (e.g., the whiteboard 192) in the local environment 101 as opposed to an individual (e.g., a current speaker). Determining a peripheral device (e.g., the back right camera 181) has a better view of a key region (e.g., the whiteboard 192) can be based on determining the content data from the back right camera 181 includes more of (1) a view of the key region, (2) an unobstructed view of the key region, or (3) a view of readable text in the key region than other peripheral devices.

In some embodiments, determining a peripheral device (e.g., the back right camera 181) has a better view of a current speaker or a key region can also be based at least in part on determining that the one or more other peripheral devices include a view of the current speaker or the key region with an interfering signal. In some embodiments, examples of interfering signals that can prevent a peripheral device from having a better view than other peripheral devices can include a distracting movement, white balance issues, other image color issues, reflections, glare, obstructed views (e.g., view of current speaker is obstructed by standing person or an object), or predefined areas of a room or parts of a scene that is desired to be blocked (e.g., as window or door opening).

As stated above, the method 6000 can also be executed for selecting audio content. Determining which peripheral device has higher quality audio content data at block 6004 can be performed, for example, by determining the content data from a first peripheral device (e.g., whiteboard microphone 193) includes a speech (e.g., audible sounds coming from a person) from of a current speaker and the content data from the second peripheral device (e.g., overview microphone 163) includes speech from the current speaker and unwanted audio. Unwanted audio can include audible sounds other than speech (e.g., shuffling papers).

At block 6006, a second set of content data from the back right camera 181 is transmitted to the conference hub 110 via the first communication link based on determining the first set of content data from the back right camera 181 has a higher quality than the first set of content data from the front right camera 171 and the whiteboard camera 191. In some embodiments, the first set of content data transmitted to the conference hub 110 or to the whiteboard camera 191 acting as the primary peripheral device can be transmitted via one or more communication links that are separate from the first communication link as described above in the method 4000. Using a separate communication link can help reduce the likelihood that the transmission and processing of the second set of content data can be slowed down by the transmission and processing of the first set of content data.

At block 6008, the second set of content data from the back right camera 181 (e.g., video of the current speaker 5 standing near the whiteboard 192) is transmitted to the remote video conferencing location 102 by the conference hub 110.

While the foregoing is directed to embodiments of the present disclosure, other and further embodiments of the disclosure may be devised without departing from the basic scope thereof, and the scope thereof is determined by the claims that follow.

What is claimed is:

1. A computer implemented method of selecting one or more content sources to provide content data for transmission to a remote video conferencing location, wherein
   the one or more content sources are selected from a plurality of peripheral devices that are positioned in a first environment, one or more of the plurality of peripheral devices are configured as master devices, one or more of the plurality of peripheral devices are configured as slave devices, the plurality of peripheral devices comprise one or more clusters, and the one or more clusters each comprise a master device and one or more slave devices in communication with the master device; the method comprising:
   (a) receiving, by the master device in each cluster of the one or more clusters, data confidence levels determined by respective ones of the one or more slave devices in communication with the master device;
   (b) comparing data confidence levels determined by at least some peripheral devices of the plurality of peripheral devices, wherein the data confidence levels determined by the at least some peripheral devices include the data confidence levels received by the master device of each of the one or more clusters at (a);
   (c) based at least in part on (b), selecting one of the plurality of peripheral devices as a first content source, wherein the first content source is the master device or one of the one or more slave devices in a first cluster of the one or more clusters; and
   (d) when the first content source is one of the one or more slave devices of the first cluster, receiving, by the master device in the first cluster, first content data from the first content source and transferring, by the master device in the first cluster, the first content data to a conference hub.

2. The computer implemented method of claim 1, wherein each one of the data confidence levels compared at (b) is determined by a respective one of the at least some peripheral devices based on an analysis of its captured content data.

3. The computer implemented method of claim 2, wherein selecting the first content source comprises determining the first content source has a higher data confidence level than other ones of the plurality of peripheral devices.

4. The computer implemented method of claim 1, wherein when the first content source is one of the one or more slave devices of the first cluster, the first content source transmits the first content data based on a request received from the master device of the first cluster.

5. The computer implemented method of claim 1, further comprising:
   (f) before selecting the first content source at (c), transmitting to the conference hub, by the master device of each of the one or more clusters, metadata comprising data confidence levels determined by the master devices and the one or more slave devices in communication with the master device, wherein comparing data confidence levels at (b) comprises comparing, by the conference hub, at least some of the data confidence levels in the metadata received from the master devices of the one or more clusters.

6. The computer implemented method of claim 1, wherein selecting the first content source at (c) comprises:
   (i) determining that a first peripheral device of the at least some peripheral devices has the highest data confidence level of the at least some peripheral devices;
   (ii) determining that the first peripheral device is receiving an interfering signal;
   (iii) determining that a second peripheral device of the at least some peripheral devices has the next highest data confidence level; and
   (iv) selecting the second peripheral device as the first content source.

7. The computer implemented method of claim 6, wherein the first content data includes at least audio data, and
   the interfering signal comprises unwanted audio data captured by the first peripheral device.

8. The computer implemented method of claim 7, wherein the unwanted audio data comprises audio data other than audible speech.

9. The computer implemented method of claim 6, wherein the first content data comprises at least video data, and
   the interfering signal comprises undesirable visual elements captured by the first peripheral device.

10. The computer implemented method of claim 1, further comprising:
    (f) based on the selection of the first data source at (c), transmitting, by one or more of the master devices of the one or more clusters, a signal to one or more non-selected ones of the plurality of peripheral devices to not transmit content data of the first content data.

11. The computer implemented method of claim 1, wherein the peripheral device selected as the first content source did not have the highest data confidence level, between the compared data confidence levels, for the first content data.

12. The computer implemented method of claim 1, further comprising (f) based on comparing the data confidence levels at (b), adjusting a resolution of content data to be transmitted from one or more slave devices of the plurality of peripheral devices to the respective master device in communication therewith, wherein the adjusted resolution is one of at least two or more resolutions that can be transmitted from the one or more slave devices.

13. The computer implemented method of claim 1, wherein comparing the data confidence levels at (b), includes adjusting, by use of a correction factor, at least one of the data confidence levels.

14. The computer implemented method of claim 1, further comprising (f) before selecting the first content source at (c):
    (i) associating a field of view of a first peripheral device of the plurality of peripheral devices with a detection region of a second peripheral device of the plurality of peripheral devices;
    (ii) determining that the data confidence level of the first peripheral device is above a threshold value; and
    (iii) increasing, by use of a correction factor, the data confidence level of the second one of the plurality of peripheral devices.

15. The computer implemented method of claim 14, wherein determining the data confidence level of the first peripheral device is above the threshold value comprises determining a gaze or speech of a current speaker in the first environment is directed to the first peripheral device.

16. The computer implemented method of claim 1, further comprising:
based at least in part on (b), selecting a second content source from the plurality of peripheral devices as an auxiliary source for the first content data; and
transferring, by the master peripheral device in the cluster having the second content source, content data from the second content source to the conference hub.

17. The computer implemented method of claim 1, further comprising:
(f) when the first content source is the master device of the first cluster, transferring, by the master device of the first cluster, the first content data to the conference hub.

18. The computer implemented method of claim 17, further comprising:
(g) transmitting, by the conference hub, the first content data received from the master device of the first cluster to the remote video conferencing location.

19. The computer implemented method of claim 1, wherein comparing the data confidence levels at (b) comprises comparing, by the master device in each cluster of the one or more clusters, the data confidence levels of the peripheral devices in the cluster.

20. A system for selecting a content source in a first environment to provide content data for transmission to a remote environment, the system comprising:
one or more clusters of peripheral devices, each cluster comprising a peripheral device that is a master device and one or more peripheral devices in communication with the master device that are slave devices, wherein the master device in a first cluster of the one or more clusters is configured to:
(a) receive data confidence levels determined by respective ones of the one or more slave devices in communication with the master device;
(b) compare data confidence levels for peripheral devices in the first cluster which includes the data confidence levels determined by the one or more slave devices;
(c) based at least in part on the comparison at (b), select the content source from the peripheral devices in the first cluster; and
(d) initiate a transmission of content data from the content source to a remote video conferencing location.

21. The system of claim 20, wherein each one of the data confidence levels compared at (b), is determined by a respective one of the peripheral devices in the first cluster based on an analysis of its captured content data.

* * * * *